(12) United States Patent
Wooldridge

(10) Patent No.: US 6,758,188 B2
(45) Date of Patent: Jul. 6, 2004

(54) CONTINUOUS TORQUE INVERSE DISPLACEMENT ASYMMETRIC ROTARY ENGINE

(76) Inventor: Joseph B. Wooldridge, 108 Lakeshore Run, Mineral, VA (US) 23117

(*) Notice: Subject to any disclaimer, the term of this patent is extended or adjusted under 35 U.S.C. 154(b) by 29 days.

(21) Appl. No.: 10/340,186

(22) Filed: Jan. 10, 2003

(65) Prior Publication Data

US 2004/0011320 A1 Jan. 22, 2004

Related U.S. Application Data

(60) Provisional application No. 60/396,176, filed on Jul. 16, 2002.

(51) Int. Cl.[7] ............................................. F02B 53/00
(52) U.S. Cl. ...................... 123/228; 123/241; 123/242; 123/244
(58) Field of Search ................. 123/241, 244, 123/242, 228, 229, 230, 237; 418/161, 176

(56) References Cited

U.S. PATENT DOCUMENTS

| | | | | | |
|---|---|---|---|---|---|
| 2,919,062 A | * | 12/1959 | Wilfred | ...... | 418/161 |
| 3,636,930 A | * | 1/1972 | Okada | ...... | 418/227 |
| 3,981,645 A | * | 9/1976 | Herzner | ...... | 418/161 |
| 4,055,156 A | * | 10/1977 | Salguero | ...... | 123/229 |

FOREIGN PATENT DOCUMENTS

| | | | | | |
|---|---|---|---|---|---|
| JP | 47-16570 | * | 5/1972 | ...... | 123/241 |
| JP | 61210228 A | * | 9/1986 | ...... | F02B/53/00 |

* cited by examiner

*Primary Examiner*—Sheldon J. Richter

(57) ABSTRACT

An internal combustion rotary engine generating continuous torque throughout an entire combustion cycle by an inverse displacement of a moving chamber and stationary convex surface is described. A rotary engine having one or more of asymmetric chambers, asymmetric crank shaft placement, and a mechanical crank arm of varying length is disclosed. An engine having greater horsepower output per unit of engine displacement than traditional piston or rotary engines is described.

35 Claims, 17 Drawing Sheets

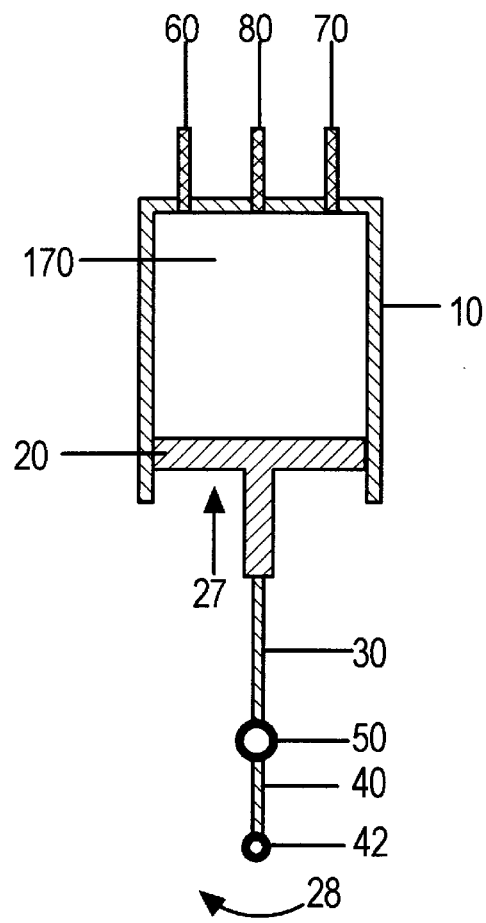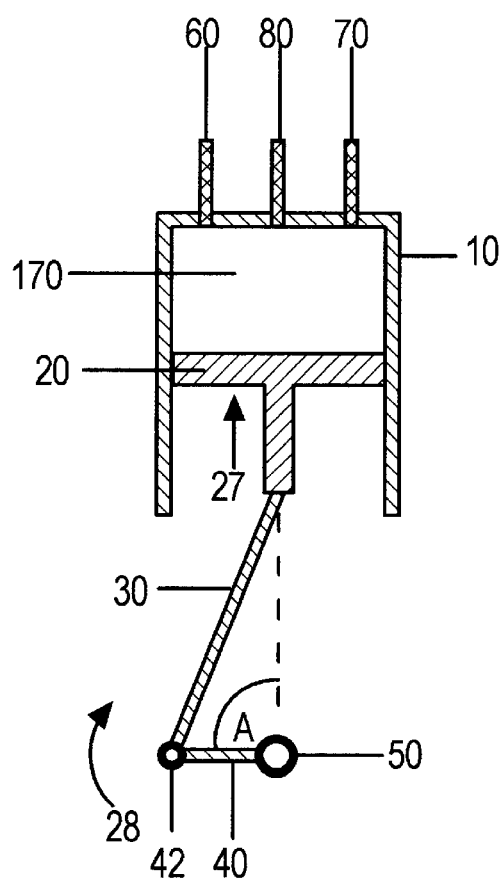
FIG. 1c
FIG. 1d

CONTINUOUS TORQUE INVERSE DISPLACEMENT ASYMMETRIC ROTARY ENGINE

CROSS-REFERENCE TO RELATED APPLICATIONS

This application claims priority to, and is a continuation-in-part of, U.S. provisional application No. 60/396,176, filed Jul. 16, 2002, which application is incorporated herein by reference.

FIELD OF ART

An internal combustion engine demonstrating one or more of inverse displacement, asymmetrical cycles, and continuous torque generation is described.

BACKGROUND

An internal combustion engine is a heat engine in which the thermal energy comes from a chemical reaction within the working fluid. The working fluid in an internal combustible engine is fuel, such as gasoline, diesel fuel, and the like, as known to practitioners in the art, and air. Heat is released by a chemical reaction of the fuel and rejected by exhausting spent fuel by-products into the environment. In contrast, in an external combustion engine, such as a steam engine, heat is transferred to the working fluid through a solid wall and rejected to the environment through another solid wall.

Internal combustion engines have two intrinsic advantages over other engine types such as steam engines. First, they require no heat exchangers except for auxiliary cooling, reducing the weight, volume, cost and complexity of the engine. Secondly, internal combustion engines do not require high temperature heat transfer through walls. Thus, the maximum temperature of the working fluid can exceed the maximum allowable wall material temperature. However, internal combustion engines also have known intrinsic disadvantages. In practice, working fluids can be limited to a combustible source, air, and products of combustion, and there is little flexibility in combustion conditions. Non-fuel heat sources such as waste heat, solar energy and nuclear power cannot be used. Further, internal combustion engines, as currently designed, can be very inefficient.

However, the advantages far outweigh the disadvantages of using an internal combustion engine. The four-cycle internal combustion engine based on the Otto cycle has widespread use in society today. More internal combustion engines are in use than all other types of heat engines combined. One problem with the internal combustion engine is poor engine efficiency. Current technology available for internal combustion engine design results in efficiencies of about 25% in converting the energy of the working fluid to usable power. Thus, poor engine efficiency increases the need for fuel while at the same time contributing high levels of pollutants to the atmosphere.

Engines are designed to convert fuel to usable power. In an internal combustion engine, the fuel is burned to provide force in the form of high pressure, which can be translated by some mechanical means into torque, or rotational movement, to move a desired object, such as an automobile driveshaft, saw blade, lawn mower blade, and the like. The torque about an axis of rotation at any given time, as described by Archimedes Principle, is equal to the product of the perpendicular force vector times the distance from the axis of rotation that the force is applied. Horsepower is related to torque output of an engine by the formula:

$$\text{Horsepower} = \text{Torque} * (\text{Revolutions per Minute}/5252) \quad (1)$$

Torque is limited in current engine designs by the amount of force that can be applied to the crank shaft at any given time, and the geometry of the mechanical translation that controls the angle and distance from the crank shaft at which the force is applied. In current internal combustion engine technology, there is little flexibility to change the geometry of the mechanical translation of force into torque. In order to increase torque, an increase in the amount of force generated is required, which would create a larger displacement engine and require more fuel.

A focal point in current internal combustion engine technology is the relationship between horsepower (hp) output and cubic inch of engine displacement, or total engine working volume. A desirable relationship between horsepower and cubic inch of engine displacement is approximately 1 to 1. This means that 1 hp of output is generated for each cubic inch of engine displacement. However, most internal combustion engines currently available do not have this 1:1 relationship, achieving only about 0.85 hp per cubic inch of engine displacement. With various known incremental improvements in design, for example, the addition of a turbo charger, horsepower output levels can be increased beyond about 1 hp per cubic inch of total engine displacement. Current improvements to efficiency are, however, only incremental in benefit and at a cost of great complexity and expense.

Most internal combustion engines are piston engines. In an internal combustion piston engine, fuel can be burned to create pressure, which can be used to create force for movement of the piston. As shown in FIGS. 1a–1d, in a piston engine, fuel can be directed into a chamber and compressed by a piston. A spark can be used to ignite the fuel, causing combustion of the fuel and an increase in the pressure and temperature inside the chamber, which causes an expansion of the working volume in which the fuel can be located. The combustion products, or exhaust, can be released to the environment. This sequence of four cycles, known as (1) intake, (2) compression, (3) combustion and (4) exhaust, are known collectively as an Otto cycle. Almost all internal combustion engines today can be designed using the Otto cycle. The sequence of the Otto cycle occurs in the order listed. The compression and combustion cycle are companion cycles. Most of the work input occurs during the compression cycle, while most of the output power can be generated during the combustion cycle. These two cycles are reverse processes of each other and are typically shown graphed together with like coordinates on a pressure volume (PV) diagram, which shows the net work output of the system. The exhaust and intake cycles are also companion cycles, and are reverse processes of each other in traditional engines. During the exhaust cycle, the working volume can be reduced to expel exhaust, and during the intake cycle, the working volume can be expanded to intake fuel. The exhaust and intake cycles are not graphed on a PV diagram because the work done during each cycle can be considered negligible. An exemplary PV diagram is shown in FIG. 2, and illustrates the compression cycle between A and B, the ignition of the fuel and increase in pressure in the working volume between B and C, the combustion cycle and expansion of the working volume between C and D, and the exhaust and intake cycles between D and A.

Compression and combustion are reverse processes of each other, and exhaust and intake are also reverse processes of each other, in that the way the working volume contracts during combustion or exhaust is the exact reverse process of the way it expands during combustion or intake, respectively. The total change in the working volume during each movement of a piston can be the same but in the opposite direction of the change in working volume of the previous movement of the piston, and the direction of piston movement can be the same but in the opposite direction of the previous movement. The mechanical translation of piston force into torque and torque back into force on the piston are reverse mechanical processes.

As shown in FIGS. 1a–1d, each individual stroke of a piston engine corresponds to a linear movement of the piston 20 within a chamber 10. As the piston 20 moves along the chamber wall in a direction 26 as shown in FIG. 1a, creating an increase in the working volume 170, fuel can be brought into the chamber 10 from the intake port 60, forming the intake cycle (FIG. 1b). At the end of the intake cycle and as shown in FIG. 1c, the piston 20 reverses direction of movement along the chamber wall, moving in direction 27, and compressing the fuel and present air as shown in FIG. 1d, forming the compression cycle. Near the beginning of the combustion cycle (FIG. 1a), the compressed fuel/air mixture can be ignited by a spark from the ignition port 80, causing the fuel/air mixture to dramatically increase in temperature and pressure, igniting and burning the fuel to create gasses. The trapped gasses cause an increase in pressure in the working volume, causing the working volume 170 in the chamber to expand (FIG. 1b). The energy of the contained combustion creates force that can be used to create torque. The combustion products can be exhausted to the external environment through an exhaust port 70 during the exhaust cycle (FIG. 1d). A piston traverses the length of a chamber four times in order to move through the sequence of the Otto cycle, as illustrated above. A piston can move through the Otto cycle sequentially. However, because work is extracted only during the combustion cycle, more than one piston can be used and interconnected such that at least one piston can be generating torque at any given time, pushing the other pistons through the other cycles. Even multiples of pistons, such as 2, 4, 6, 8, or more can be used in conjunction, one or more pistons being in a different portion of the Otto cycle than the remaining pistons at any given time. The movement of multiple pistons in opposite directions provides a balanced movement so the engine does not vibrate uncontrollably, and can make the engine easier to start.

In the piston engine as shown in FIGS. 1a–d, the movement of the piston 20 in the chamber 10 can be translated into torque by connection of the piston 20 to a crank shaft 50 through a connecting rod 30 and crank arm 40, connected to connecting rod 30 by crank pivot 42. The motion 26, 27 of the piston 20 can be in line with the crank shaft 50. The crank shaft turns in a circular motion 28, driven by the force of the linear movement of the piston. Torque is equal to force times the perpendicular distance the force is applied from the pivot point, in this case, the crank shaft 50. At the beginning of the combustion cycle, the piston 20 and crank arm 40 can be in alignment with the crank shaft 50 and the entire force of the piston 20 can be directly on top of the crank shaft 50, as shown in FIG. 1a. The perpendicular distance the force is applied to the pivot point at that instant is zero, and the torque generated is zero. It is not until the crank shaft 50 rotates some amount that the crank arm 40 will gain some perpendicular distance from the crank shaft 50 and start to generate torque. This relationship varies approximately as the sine of the angle A that the crank arm 40 makes with the line of piston motion. The force on the piston 20 can be largest near the beginning of the combustion cycle when the fuel first combusts and is under maximum pressure and minimum volume. This massive component of energy is lost because the mechanics of the engine don't allow the force from the piston to be applied in the direction that will generate torque, that is, at an angle to the crank shaft. In effect, the force from the piston is only partially translated into torque, with the rest of the force being dissipated as waste heat. A large component of energy loss in current internal combustion piston engine technology occurs because of the mechanical limitations of converting the force from the piston into torque on the shaft. This issue is also present in current internal combustion rotary engine technology, such as a "Wankel" rotary engine, as shown in FIGS. 3a–c.

In its most basic form and as shown, for example, in FIGS. 3a–c, a rotary engine typically has a single symmetrical chamber 10. In place of a piston is a multi-face rotor 22 that pushes against a chamber wall as it rotates within the chamber 10 around a crank shaft 50. The rotor can rotate clockwise, for example, as shown in FIGS. 3a–c. As the rotor 22 turns, it creates changes in the working volumes 170a, 170b, and 170c, necessary for each of the four cycles of the Otto cycle to occur. For a Wankel rotary engine, the chamber 10 can be approximately oval with the crank shaft 50 at the center. The rotor 22 for a Wankel rotary engine has a roughly triangular shape, forming three convex shaped rotor faces 5a–c and three separate working volumes 170a–c. A circular hole 55 for the crank shaft 50 can be set in the center of the rotor 22. The rotor 22 makes a symmetrical motion around the crank shaft 50. The shape of the chamber wall can be designed such that all three apices 21a–c of the rotor 22 can be in constant contact with the chamber wall as the rotor 22 turns around the crank shaft 50 to complete each of the four cycles, as demonstrated in FIGS. 3a–c. The inside of the rotor 22 interacts with and turns the crank shaft 50 by means of a gear (not shown) located on the inside of the circular hole 55. As in the piston engine, an intake port 60, exhaust port 70, and ignition port 80 can be present in order to provide fuel to, expel fuel from, and ignite fuel in the working volume 170a–c, enabling the Otto cycle.

In a rotary engine, there is little flexibility in changing the shape of the chamber wall or rotor. Torque can be generated by the interaction of the rotor face and the chamber wall. As in the piston engine, the problem of zero torque generation during some portion of the combustion cycle is present. When the rotor face and chamber wall push directly against each other with no angle of incidence between them, which can be the case at both the beginning and end of the combustion cycle, no torque is generated. The rotor face must push against the chamber wall at some angle of incidence in order to slide along the chamber wall, spinning the shaft and generating some component of torque. In a rotary engine, the direction the rotor and chamber wall push against each other is in alignment with the shaft at the beginning of the combustion cycle, and at the end of the combustion cycle. Thus, just as in the piston engine, the torque generated by the rotary engine is zero at both the beginning and end of the combustion cycle, wasting much of the generated force. It is noted that in a rotary engine, the torque varies as a function of the angle of incidence between the direction of force generated by the rotor face and the direction of the force from the outside chamber wall, and is equal to the force from the rotor face times the sine of the angle of incidence times the cosine of the angle of incidence. The angle of incidence varies from about 0 degrees to about 20 degrees. This can result in less mechanical translation of force into torque than is present in a piston engine, wherein torque varies as a function of the sine of an angle that ranges from 0 to 180 degrees.

Traditional internal combustion engines translate some of the force on the piston or rotor into torque about the crank shaft. In looking at a geometrical relation of the piston and crank shaft, a mathematical expression for the calculation of torque for a piston engine can be written. FIG. 4 depicts the geometric relation of the piston force F(p), connecting rod L, crank arm C and crank shaft CS from which a mathematical expression can be derived. As shown in FIG. 4, as the crank arm C rotates around the crank shaft, angle A can be created. At the beginning of the combustion cycle, angle A is equal to zero degrees. Angle A increases to 180 degrees as the combustion cycle progresses. The torque around the crank shaft at any time during the combustion cycle can be calculated by summing the horizontal and vertical components of torque, F(x) and F(y), created by the movement of the connecting rod L and the crank arm C, using known trigonometric and algebraic substitutions, as follows:

$$\text{Torque} = F(x)*C*\sin(A) + F(y)*C*\cos(A) \tag{2}$$

$$L^2 = X^2 + Y^2 \tag{3}$$

$$Y = C*\sin(A) \tag{4}$$

Substituting to solve for X in formula (3) yields:

$$X = \sqrt{L^2 - C^2 * (\sin(A))^2} \tag{5}$$

$$F(y)/F(x) = Y/X = C*\sin(A)/\sqrt{L^2 - C^2 * (\sin(A))^2} \tag{6}$$

Presuming F(x)=F(p):

$$F(y) = F(p)*C*\sin(A)/\sqrt{L^2 - C^2 * (\sin(A))^2} \tag{7}$$

Substituting the above into formula (1) yields:

$$\text{Torque} = F(p)*(C*\sin(A) + C^2*\cos(A)*\sin(A)/\sqrt{L^2 - C^2 * (\sin(A))^2}) \tag{8}$$

As shown in equation (2), the total torque in an engine can be equal to the force F(x) times its perpendicular distance from the shaft, which is C*sin(A), plus the force F(y) times its perpendicular distance from the shaft, which is C*cos(A). Substituting the relationships between F(x), F(y), and F(p) yields equation (8) for torque. Because the equation for torque has a sin(A) in each component, torque will vary as sin(A). Torque is equal to zero when A is zero degrees or 180 degrees. The mechanical translation function of force into torque for a 1 liter piston engine is shown graphically in FIG. 5 as line P.

In a piston engine, force on the piston is largest near the beginning of the combustion cycle when the pressure inside the chamber is the largest. At the beginning of the combustion cycle, angle A is zero degrees, and the components of torque are equal to zero. The entire force from the piston near the beginning of the combustion cycle is dissipated as heat and friction because it is not translated into torque, wasting energy. Torque does not begin to be generated in a traditional piston engine until the crank arm rotates some amount beyond zero degrees.

Traditional rotary engines generate torque in a different way than piston engines. Rotary engines generate torque by two surfaces interacting or pushing at an angle against each other. The torque is a function of the angle of incidence between the direction of the forces generated by the rotor face and stationary concave chamber wall surface. When the forces of the two surfaces push in exact opposite directions, no component of torque can be generated because the force of the rotor F(r) and the force of the wall F(s) are in line with the crank shaft CS, generating no angle of incidence, as shown in FIG. 6. In order for a component of torque to be generated, the forces have to push against one another at some angle of incidence greater than 0 degrees and less than 90 degrees. Intersection of the forces generated at some angle other than 0 degrees or 90 degrees will cause sideways movement of the interacting surfaces in relation to each other about the crank shaft CS and generation of a component of torque F(t), as shown in FIG. 7. As shown in FIG. 7, torque can be equal to the force of the rotor F(r) times the distance D from the crank shaft CS to the chamber wall S, times cos(C)*sin(C), where C is the angle of incidence formed between the chamber wall and the direction of the component of force generating torque F(t), and F(s) is the force of the chamber wall.

$$\text{Torque} = F(t)*D \tag{9}$$

$$\text{Component of force along the chamber wall} = F(s)*\sin(C) \tag{10}$$

$$\text{Component of force generating torque } F(t) = F(s)*\sin(C)*\cos(C) \tag{11}$$

$$F(s) = F(r), \text{ wherein } F(r) = \text{force from the rotor} \tag{12}$$

$$\text{Torque} = F(r)*\sin(C)*\cos(C)*D \tag{13}$$

The value of sin(C)*cos(C) has a maximum value at 45 degrees. At 45 degrees, the value of cos(C)*sin(C) is equal to ½.

The traditional rotary engine has a similar problem in the mechanical translation of force into torque as is present in the traditional piston engine. In the rotary engine, the direction of force from the rotor face and the direction of force from the outer chamber wall can be in alignment at the beginning and end of the combustion cycle. No torque can be generated at the beginning and end of the combustion cycle because the forces of the rotor face and outer chamber wall are aligned with each other, and are each aligned with the crank shaft, creating no angle of incidence. It is only during the middle portion of the combustion cycle that the rotor face and outer chamber wall are pushing against each other at an angle greater than 0 degrees and less than 90 degrees to create a component of torque.

A further problem in achieving a greater translation of force into torque with current technology can be the length of the crank arm. Torque equals the force times the perpendicular distance away from the pivot point or crank shaft that the force is applied. If the crank arm were made longer, more torque would be generated than with a shorter crank arm because there would be more distance between the crank shaft and force point. Functionally, the length of the crank arm is limited by the mechanics of the engine, for example, by the compression ratio of the fuel in the engine. A longer crank arm would correspond to a higher compression ratio during the compression cycle. In the case of a piston engine, the piston would need to travel a longer distance. However, a longer travel distance of the piston means a larger total engine displacement and a higher compression ratio for the fuel and air mixture during the compression cycle. Compression ratios for gasoline, the most common fuel source, are limited to a maximum of about 10:1 before the gasoline detonates. The crank arm length in an engine is determined by the mechanics of the engine and the maximum compression ratio of the fuel. The crank arm length can not be increased because this would result in a higher compression ratio than the maximum compression point of the fuel source.

As described herein and known in the art, torque in an engine translates into horsepower by the Formula (1). More horsepower can be generated if the mechanical translation means to convert existing force on a piston or rotor into torque continuously throughout the combustion cycle can be determined while maintaining favorable thermodynamic and fluid mechanic properties. Greater torque, and therefore horsepower, can be generated if the mechanical means can be determined that can apply force at a more favorable distance from the shaft during the combustion cycle.

SUMMARY

According to various embodiments, an internal combustion engine which achieves greater torque as compared to a traditional internal combustion engine is described. According to various embodiments, an internal combustion engine capable of generating a relationship of horsepower per cubic inch of displacement of about 4 to 1 is described.

According to various embodiments, a rotary engine having a concave-shaped contour moving about a fixed convex contour is described.

According to various embodiments, an internal combustion rotary engine capable of generating torque continuously throughout the combustion cycle is described. According to various embodiments, torque can be generated continuously throughout the entire combustion cycle by controlling the angle of incidence of the force generated by a concave-shaped contour and the opposing force generated by a stationary surface.

According to various embodiments, a crank arm length of an internal combustion rotary engine as described herein can be longer than a crank arm length of an internal combustion piston engine of the same displacement.

According to various embodiments, an internal combustion engine has at least two concave-shaped contours and one shaft located within each of at least two chambers set at 180 degrees to each other, forming a balanced engine assembly. According to various embodiments, each chamber can be asymmetrically shaped.

According to various embodiments, an internal combustion engine having a crank arm that varies in length throughout the engine cycle is described. According to various embodiments, the crank arm length can increase during the combustion cycle and decrease during the compression cycle.

According to various embodiments, a crank shaft can be located off-center within a chamber of an internal combustion rotary engine.

According to various embodiments, an internal combustion engine can have cycles of combustion, compression, intake and exhaust which are asymmetric with respect to changes in a working volume.

According to various embodiments, an internal combustion engine can have asymmetric translation of force into torque between the cycle of combustion and the cycle of compression.

A method of generating continuous torque during a combustion cycle is described

BRIEF DESCRIPTION OF THE DRAWINGS

Embodiments of the invention as described herein, and various embodiments of the prior art, are set forth in the accompanying Figures as indicated below:

FIGS. 1a–d depict various positions of a piston during an engine cycle in a piston engine;

FIG. 19b is a scaled graph of a portion of the curve of FIG. 16, that matches the shape of the outer chamber wall of FIG. 19a.

Like parts are numbered the same throughout the Figures. It is understood that the Figures represent various embodiments of the invention, and may not be to scale. Other embodiments will be known to practitioners in the art upon review of the accompanying description and appended claims.

DETAILED DESCRIPTION

In order to achieve a more efficient internal combustion engine that produces more horsepower and torque per unit of engine displacement, several features of a traditional internal combustion engine, alone or in conjunction, can be changed. These features can include one or more of a relationship between a stationary chamber surface and a moving part that creates changes in a working volume, an angle at which force is applied to a crank shaft during a combustion cycle, a mechanical translation of force into torque generated throughout the combustion cycle, and a symmetry of the cycles of the engine with respect to changes in a working volume. Changing one or more of these features can result in a more energy efficient internal combustion engine, as will now be described with reference to the Figures.

Figure 8A:
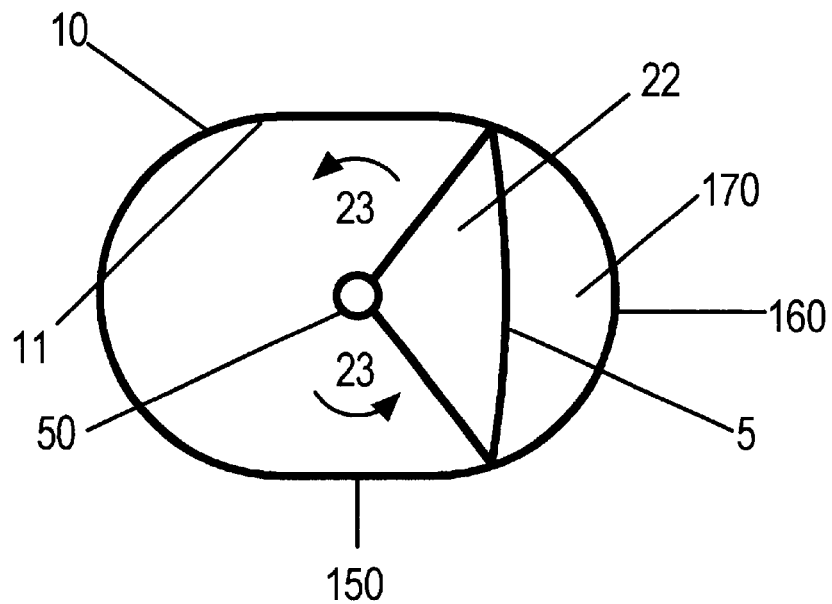
FIG. 8a is a schematic diagram of one face of a rotor wherein the rotor face is in a position such that a working volume is at a maximum.
Figure 8B:
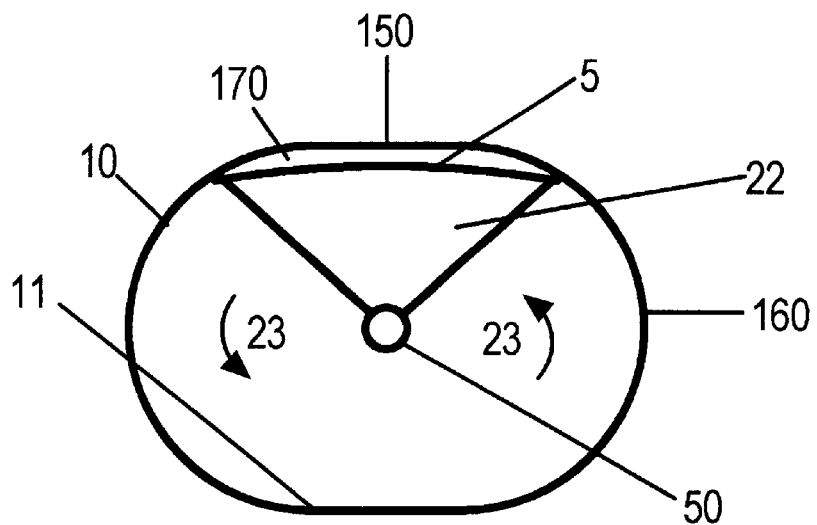
FIG. 8b is a schematic diagram of one face of a rotor wherein the rotor face is in a position such that a working volume is at a minimum.

Traditional internal combustion engine geometry, including both piston engines and rotary engines, works by changing a volume of space in which a working fluid can be present in a chamber, or a "working volume." The working volume expands on fuel intake, reduces on compression of fuel, expands on ignition of fuel, and reduces upon expelling combustion byproducts from a chamber. In traditional piston and rotary engines, the change in working volume can be achieved by moving a substantially convex shape, the piston or rotor face, along a stationary concave surface of a chamber, as can be seen in FIGS. 1a–d and FIGS. 3a–c, respectively. FIGS. 8a and 8b demonstrate the relationship between a stationary concave surface 11 of a chamber 10, a single face 5 of a convex shaped rotor 22, and a working volume 170 created by the space between the stationary concave surface 11 and the convex rotor face 5. As shown in FIG. 8a, an increase in the working volume 170 in a traditional rotary engine occurs when the convex rotor face 5 moves around a crank shaft 50 in a direction 23 from a location on the stationary concave surface 11 of the chamber 10 that has a larger radius of turn 150 to a position on the concave surface 11 of the chamber 10 that has a smaller radius of turn 160. Thus, the working volume 170 is at a maximum when the convex rotor face 5 is at a location on the stationary concave surface 11 of the chamber 10 that has a small radius of turn 160. As shown in FIG. 8b, a decrease in the working volume 170 occurs when the convex rotor face 5 moves around a crank shaft 50 in a direction 23 from a position on the concave surface 11 of the chamber 10 that has a smaller radius of turn 160 to a position on the concave surface 11 of the chamber 10 that has a larger radius of turn 150. Thus, the working volume 170 is at a minimum when the convex rotor face 5 is at a location on the stationary concave surface 11 of the chamber 10 that has a large radius of turn 150.

Figure 9A:
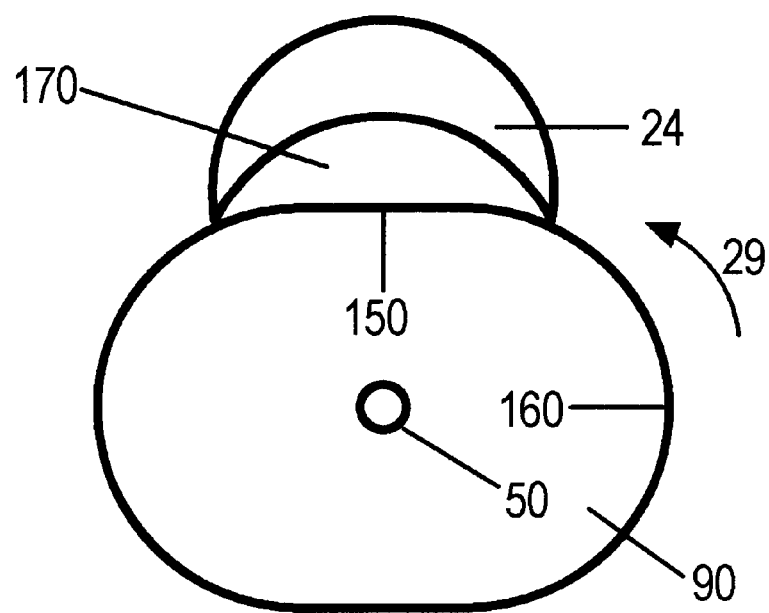
FIG. 9a is a schematic diagram of one embodiment of the invention wherein a concave surface is in a position in relation to a stationary convex surface such that a working volume is at a maximum.
Figure 9B:
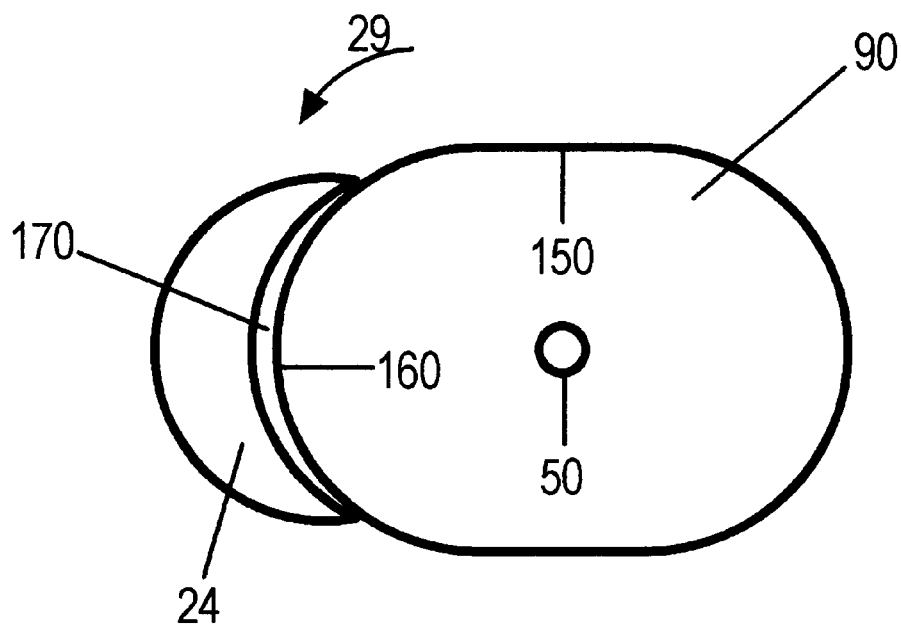
FIG. 9b is a schematic diagram of one embodiment of the invention wherein a concave surface is in a position in relation to a stationary convex surface such that a working volume is at a minimum.

In order to increase engine efficiency over a traditional rotary or piston engine, in one embodiment of the invention, the geometry of how the working volume is formed can be changed. Greater control of how an engine mechanically translates force into torque during a combustion cycle can be achieved by reversing the relationship between a moving convex shape and a stationary concave surface found in traditional engines. According to various embodiments of the invention, a substantially concave-shaped contour moves around a stationary convex surface to create a change in the working volume, as shown in FIGS. 9a and 9b. As seen in FIG. 9a, this inverse displacement of the moving part and stationary surface, as compared to traditional engines, increases a working volume 170 when the concave-shaped contour 24 moves around a crank shaft 50 on the stationary convex surface 90 in a direction 29 from a position on the stationary convex surface 90 having a smaller radius of turn 160 to a position on the stationary convex surface 90 having a larger radius of turn 150. As shown in FIG. 9b, the working volume 170 decreases when the concave-shaped contour 24 moves around a crank shaft 50 in a direction 29 from a position on the stationary convex surface 90 having a larger radius of turn 150 to a position on the stationary convex curve 90 having a smaller radius of turn 160. How the working volume is formed creates an inverse relationship of where on the stationary surface a maximum working volume will occur as compared to traditional rotary engine technology.

Inverse displacement of a traditional spatial relationship between a moving part and a chamber surface in an engine creates changes in the working volume by moving the concave space that defines the working volume along some stationary convex surface, as opposed to current engine technology wherein some movable convex surface moves through a working volume in a stationary concave chamber. An analogy to a piston engine would be to hold the piston still and move a cylindrical chamber up and down along the piston to create changes in a working volume. Inverse displacement of a moving part and a stationary surface can be used to modify rotational movement in an engine. In current engine technology, a working volume can only expand in the exact reverse way that it contracted because when a part moves in through the working volume in the chamber, the part can only move out again the same way it moved in through the working volume. Expansion and contraction of the working volume of a traditional engine are exact reverse processes and are symmetric throughout the four cycles of intake, compression, combustion and exhaust. With inverse displacement of a moving part and stationary surface, expansion and contraction of a working volume, and the forces resulting therefrom, can be controlled by specifying the shape of the working volume. By having control of the path and shape of the working volume, a favorable mechanical translation of force into torque can be designed, providing an engine with much greater horsepower per unit of displacement. Changes in the working volume can occur as a function of a radius of a curve of a convex surface against which a moving concave-shaped contour slides. The working volume can contract and expand to different amounts depending on the shape of the stationary convex surface at each point along the path of the moving concave-shaped contour. The inverse relationship of the moving part and stationary surface in an inverse displacement engine allow the four cycles of intake, compression, combustion and exhaust to be independent of one another and optimized, such that the cycles can be asymmetrical. An inverse displacement engine is now discussed in detail.

Figure 10:
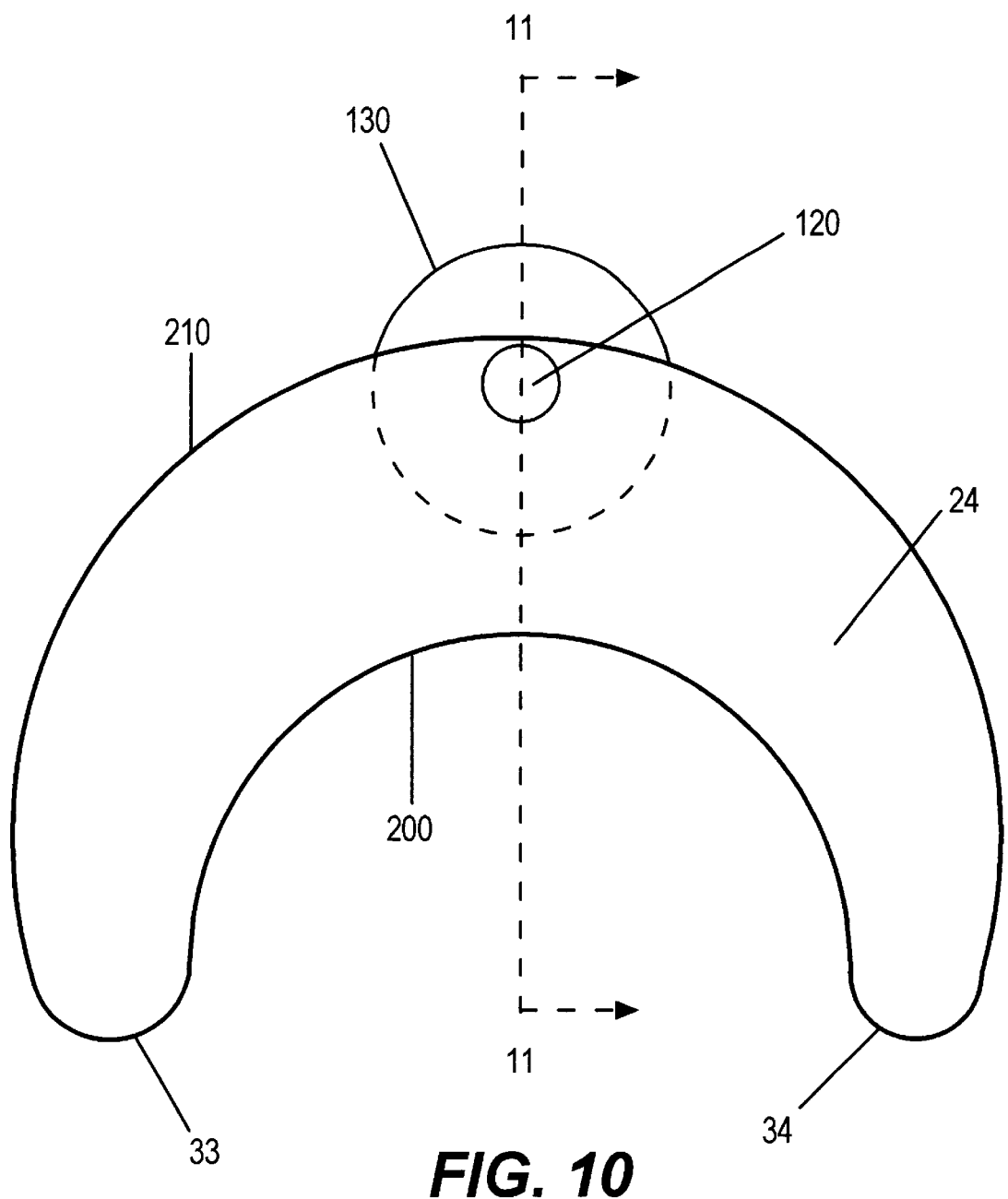
FIG. 10 depicts a front view of one embodiment of a concave-shaped contour of the invention.
Figure 11:
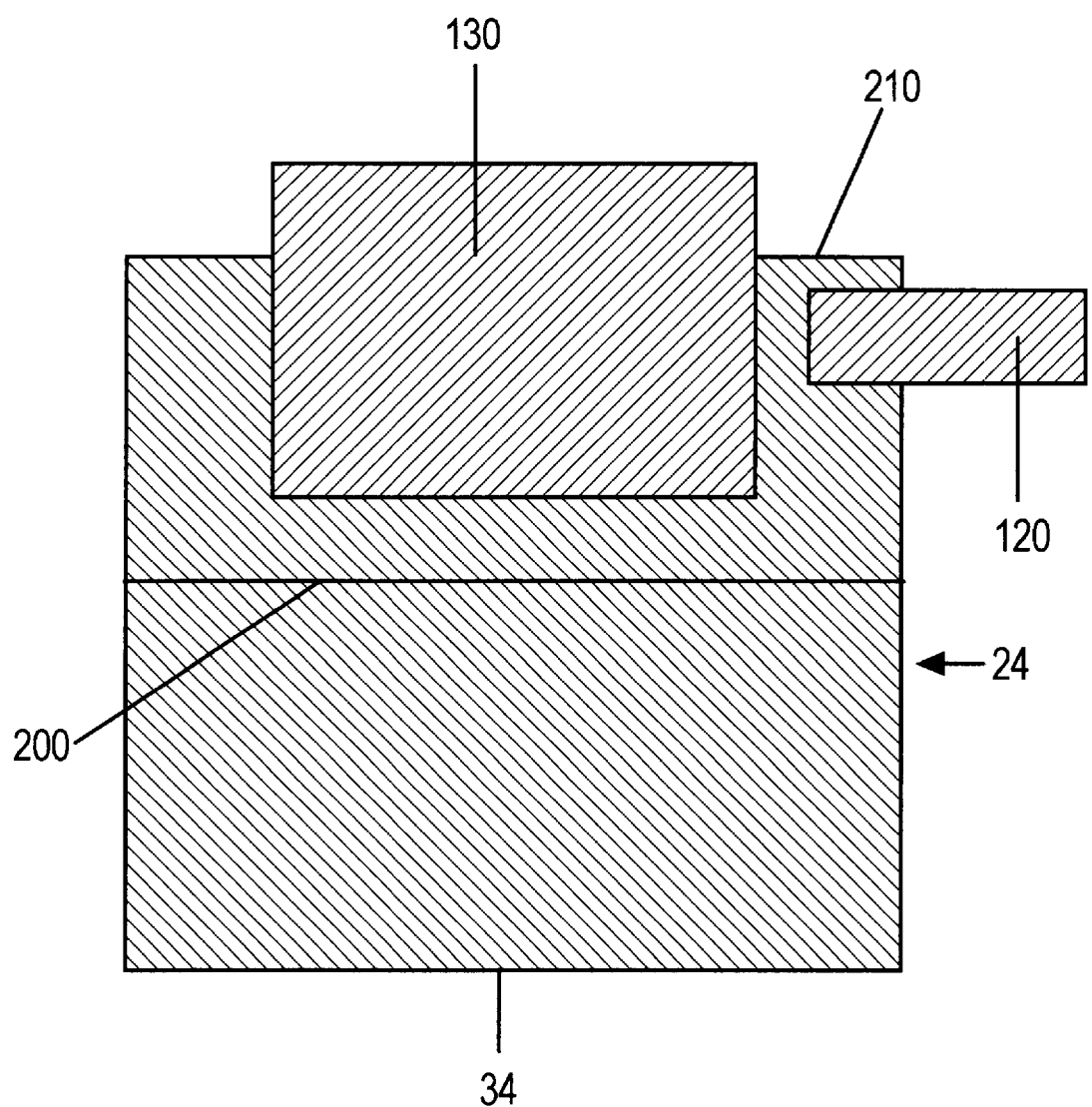
FIG. 11 is a cross-sectional view of one embodiment of the concave-shaped contour of the invention taken along line 11—11 of FIG. 10.

According to various embodiments, a concave-shaped contour as shown in FIG. 10 and FIG. 11 (cross section along line 11—11 of FIG. 10) can be used in an inverse displacement engine. As depicted in FIGS. 10 and 11, the concave-shaped contour 24 can be semi-spherical in shape, and can be similar to the shape of a lengthwise half of a cylinder. An inner curve 200 of the concave-shaped contour 24 can be semi-circular, or can be any other shape which complements a shape of an inner chamber wall of an engine chamber. The inner curve 200 of the concave-shaped contour 24 can have a smaller radius of turn than the smallest radius of turn of an inner chamber wall. The concave-shaped contour 24 has legs 33, 34 which can remain slidably abutted against the inner chamber wall as the concave-shaped contour 24 circumvents the inner chamber wall. The inner curve 200 and legs 33, 34 of the concave-shaped contour 24, together with the inner chamber wall, define a working volume. The outer curve 210 of the concave-shaped contour 24 can be any shape suitable to provide contact with an outer chamber wall of the engine chamber when legs 33, 34 are in contact with an inner chamber wall of the engine chamber. The inner curve 200 of the concave-shaped contour 24 can be any shape which, in combination with the inner chamber wall, can define a working volume that provides the desired compression ratio for a fuel and air mixture as the concave-shaped contour 24 slides along the inner chamber wall during the compression cycle.

According to various embodiments, the shape of the concave-shaped contour, inner chamber wall, and outer chamber wall can be functions of one another. These shapes must be able to interact, but are not otherwise limited, and can be any variety of curved shapes, not limited to spheres, ellipses or other traditionally defined geometric shapes. According to various embodiments wherein the inner curve 200 of the concave-shaped contour 24 is semi-circular and the concave-shaped contour has a depth about equal to the width of the concave-shaped contour, the effective pressure surface area of the inner curve of the concave-shaped contour is roughly twice that of a piston of similar volume, providing more force (force=pressure*area) to turn a crank shaft.

According to various embodiments and as shown in FIGS. 10 and 11, the concave-shaped contour 24 can be releasably or permanently slidably connected to or abut an outer chamber wall by a retainer 130 that allows the concave-shaped contour 24 to slide along the periphery of the outer chamber wall. Suitable retainers include, but are not limited to, a roller bearing, gear, or other slidable retainers as known to practitioners in the art. The retainer can be centered on the outer curve 210 of the concave-shaped contour 24 as shown in FIGS. 10 and 11, or can be offset in one or more directions.

According to various embodiments, the legs 33, 34 of the concave-shaped contour 24 can be releasably or permanently slidably connected to or abut an inner chamber wall. The legs 33, 34 of the concave-shaped contour 24 can have a slidable connector such as, but are not limited to, a roller bearing, gear, or other slidable connector as known to practitioners in the art, located on one or more leg 33, 34 of the concave-shaped contour 24, wherein the slidable connector allows the legs 33, 34 of the concave-shaped contour 24 to slide along the periphery of the inner chamber wall.

According to various embodiments and as shown in FIGS. 10 and 11, a crank pivot 120 can be located on the concave-shaped contour 24 such that the crank pivot 120 extends beyond the front surface of the concave-shaped contour 24. According to various embodiments, the crank pivot 120 can be located such that it extends beyond the front surface of the concave-shaped contour 24 at any point sufficient to interact with a crank disk. The crank pivot 120 can be used to push a crank disk located outside the chamber around a crank shaft as the concave-shaped contour 24 moves along an inner chamber wall of the chamber.

Figure 12:
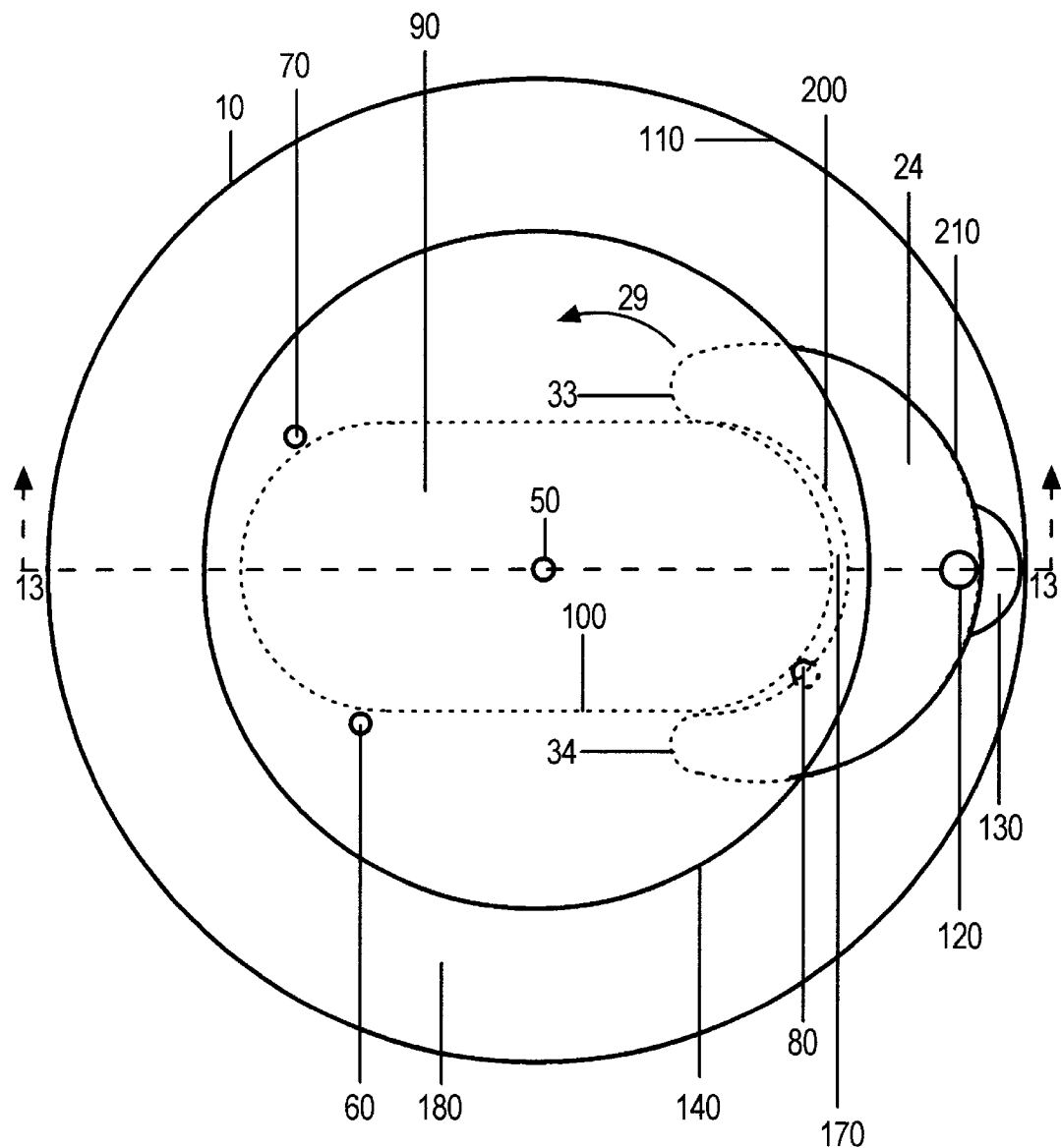
FIG. 12 is a schematic diagram of one embodiment of a rotary engine chamber showing ports for intake, ignition and exhaust, a faceplate, a concave-shaped contour, a crank pivot, and a retainer.

According to various embodiments and as shown in FIG. 12, the concave-shaped contour 24 can have a concave inner curve 200 that interacts with a stationary convex surface 100. The stationary convex surface is an inner chamber wall 100 of chamber 10. The stationary convex surface 100 can be an outer surface of an island 90. The stationary convex surface 100, the inner curve 200 of the concave-shaped contour 24, and back chamber wall 180, together with a face plate 140, define a working volume chamber for a working volume 170. The concave inner surface 200 of the concave-shaped contour 24 can be equivalent in function to one face of a rotor in a traditional rotary engine. The outer curve 210 of the concave-shaped contour 24 can interact with and slide along the outer chamber wall 110 by means of retainer 130. The outer curve 210 of the concave-shaped contour 24 can hold the legs 33, 34 of the concave-shaped contour 24 against the inner chamber wall 100, according to various embodiments. The concave-shaped contour 24 can slide or move along the inner chamber wall 100 with a slidable connector. The movement of the concave-shaped contour 24 about the inner chamber wall 100 rotates a crank shaft 50 by means of a crank disk (not shown) that interacts with both the crank shaft 50 and the concave-shaped contour 24 at crank pivot 120.

According to various embodiments, the chamber 10 can be designed to be a depth equal to the thickness of the concave-shaped contour 24. The chamber 10 can be formed by the inner chamber wall 100, which defines an island 90, the outer chamber wall 110 and the back chamber wall 180. The chamber can be formed of one or more pieces of metal, ceramic or other suitable materials as known to practitioners in the art. According to various embodiments, the inner chamber wall 100, island 90, outer chamber wall 110 and back chamber wall 180 can be formed by routing out or machining and casting a suitable material. According to various embodiments the island 90 and integral inner chamber wall 100 can be formed separate from the outer chamber wall 110 and back chamber wall 180, and attached thereto by any means known to practitioners in the art, such as but not limited to, for example, welding, heat melt, adhering, forging, or mechanically fastening. In yet another embodiment, the island 90 can be set into a space defined by inner chamber wall 100, wherein the inner chamber wall 100 can be integrally formed with the back chamber wall 180, and optionally outer chamber wall 110. The island 90 can be a hollow defined by the inner chamber wall 100. According to various embodiments, the island 90 can be solid.

According to various embodiments and as shown in FIG. 12, a face plate 140 can be located over chamber 10 covering island 90, inner chamber wall 100, a portion of concave-shaped contour 24 including inner curve 200, and a portion of back chamber wall 180, to define a working volume chamber that includes the working volume 170. According to various embodiments, the face plate 140 can be mounted on or attached to the island 90, inner chamber wall 100, or both such that the face plate 140 does not contact or interfere with movement of the crank shaft 50 or the concave-shaped contour 24. According to various embodiments, the face plate 140 covers the island 90 and inner chamber wall 100, extending beyond the inner chamber wall 100 over the chamber 10 a sufficient distance to interact with the concave-shaped contour 24 and cover the working volume 170. The face plate 140 can have a hole for passage of the crank shaft 50 through the face plate 140. In another embodiment, the face plate 140 can extend from the inner chamber wall 100 over the chamber 10 a sufficient distance to interact with the concave-shaped contour 24 and cover the working volume 170, but does not cover all of island 90. According to various embodiments, the face plate 140 does not interfere with movement of the crank pivot 120 located on the concave-shaped contour 24. According to various embodiments, the face plate 140 does not interfere with movement of a crank disk.

According to various embodiments and as shown in FIG. 12, located within chamber 10 on the back chamber wall 180 within the area of working volume 170 as working volume 170 moves within the chamber 10 can be an intake port 60, an exhaust port 70, and an ignition port 80. The location of the ports 60, 70, and 80, as shown in FIG. 12 assumes a counter-clockwise movement 29 of the concave-shaped contour 24 around the inner chamber wall 100 as the engine sequences through the cycles of intake, compression, combustion and exhaust. The ports 60, 70, and 80 can be located at positions corresponding to where each respective cycle occurs within the chamber 10. According to various embodiments, the ignition port 80 can be located on the back chamber wall 180 at a position where the working volume 170 is at a minimum and a fuel present in the chamber 10 is compressed in the working volume 170 to a maximum amount. At this position, a mixture of fuel and air in the working volume 170 can be ignited by a spark from ignition port 80. As the concave-shaped contour moves about inner chamber wall 100 and the working volume 170 expands to a maximum from the burning of the fuel and air mixture, the combustion cycle can be completed. Following the combustion cycle, the concave-shaped contour 24 can move around inner chamber wall 100 while working volume 170 contracts, expelling spent fuel and gasses from exhaust port 70 of chamber 10 in an exhaust cycle. As the concave-shaped contour 24 continues to move around inner chamber wall 100, an intake cycle can begin as the working volume 170 expands and fuel and air are taken in through intake port 60. The concave-shaped contour 24 moves around inner chamber wall 100 as working volume 170 decreases, compressing the fuel and air mixture until ignition port 80 is reached. The engine cycle can then repeat.

According to various embodiments, crank shaft 50 can be located centrally in island 90, as shown, for example, in FIG. 12. According to various embodiments, the crank shaft 50 can be off-center in island 90, allowing the concave-shaped contour to move within the chamber 10 around the inner chamber wall 100 at a variable radius. The radius can be a distance from the crank shaft 50 to the crank pivot 120 on the concave-shaped contour 24 at any given time. This distance can be the mechanical crank arm length. With an off-set crank shaft 50, the radius changes as the concave-shaped contour 24 moves around the inner chamber wall 100. The changing radius allows the total torque on the crank shaft 50 to change throughout an engine cycle. As the radius increases, the torque on the crank shaft 50 can increase. As the radius decreases, the torque on the crank shaft 50 can decrease. According to various embodiments wherein the crank shaft 50 is off-set, slots can be located in a crank disk to accommodate the changing position of the crank pivot 120 as the concave-shaped contour 24 moves around the crank shaft 50 and rotates the crank shaft 50 by means of interaction with the crank disk through crank pivot 120.

Figure 13:
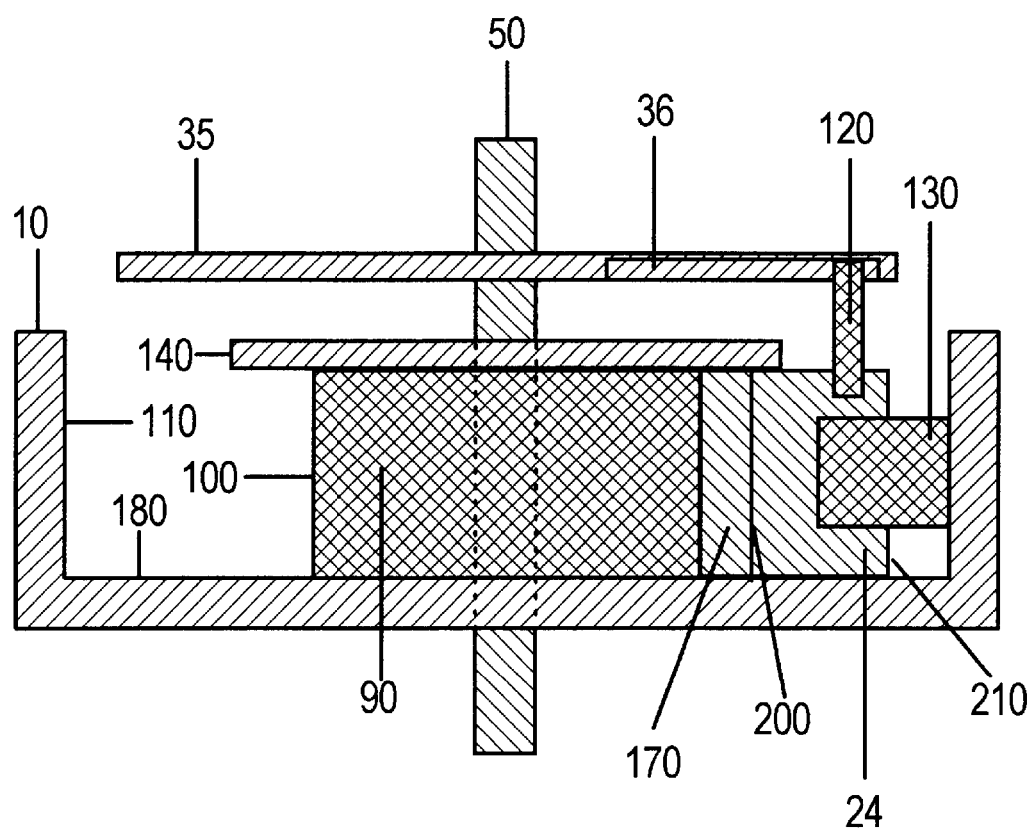
FIG. 13 is a cross-sectional view of the rotary engine of FIG. 12 along line 13—13.

FIG. 13 is a cross-sectional view along line 13—13 of the embodiment depicted in FIG. 12, additionally showing the position of a crank disk 35 having one or more slots 36. As shown in FIG. 13, according to various embodiments, an engine can include a crank disk 35 on the opposite side of face plate 140 from chamber 10. According to various embodiments, crank disk 35 can include one or more slots 36 for interaction with crank pivot 120 on concave-shaped contour 24. According to various embodiments, the slot 36 can be a recess, chamber, channel, or other depression capable of receiving crank pivot 120 in crank disk 35, as shown in FIG. 13. According to various embodiments, the slot 36 can extend through crank disk 35 such that crank pivot 120 can extend through crank disk 35 and beyond a top surface of crank disk 35. The crank disk 35 can be connected to the crank shaft 50 directly or through interaction of one or more gear, belt, or other device capable of turning crank shaft 50. According to various embodiments, crank disk 35 is permanently attached to crank shaft 50 so that crank shaft 50 rotates with crank disk 35. According to various embodiments, crank disk 50 can be rotated in a circular or nearly circular path around crank shaft 50 by movement of concave-shaped contour 24 that interacts with crank disk 35 through crank pivot 120 that fits into slot 36 of crank disk 35. As concave-shaped contour 24 moves around inner chamber wall 100, crank pivot 120 can slide back and forth in slot 36 as the radius increases or decreases. The interaction of the crank disk 35, slot 36, and crank pivot 120 functions as a variable length crank arm. According to various embodiments, the crank shaft 50 can be centrally disposed through crank disk 35. According to various embodiments, crank disk 35 can have more than one slot 36 such that more than one concave-shaped contour 24 can interact simultaneously with crank disk 35. According to various embodiments wherein more than one concave-shaped contour 24 can interact simultaneously with crank disk 35, the slots 36 are positioned in crank disk 35 to fix each concave-shaped contour 24 in a relative position about inner chamber wall 100 or about crank shaft 50.

According to various embodiments, torque can be achieved throughout a combustion cycle by designing a chamber such that an angle of incidence between a direction of force from a concave-shaped contour and a direction of force of an outer chamber wall at every point along the outer chamber wall during the combustion cycle is some angle greater than 0 degrees and less than 90 degrees. The shape of an inner chamber wall, the outer chamber wall, and the concave-shaped contour that are conducive to an angle of incidence between 0 degrees and 90 degrees can be determined algebraically with regard to a predetermined angle of incidence. The amount of torque generated by a predetermined angle of incidence C created by a force F(r) interacting with a surface can be equal to F(r)*distance D*cos(C)*sin(C), as discussed earlier. As can be determined mathematically, torque is at a maximum value when the angle of incidence C is 45 degrees. The value of cosine*sine for a 45 degree angle is equal to 0.5. According to various embodiments, other angles of incidence between about 20 degrees and about 70 degrees can generate suitable amounts of torque. According to various embodiments, the angle of incidence can change throughout the combustions cycle. The angle of incidence can decrease throughout the combustion cycle.

Figures 14, 15:
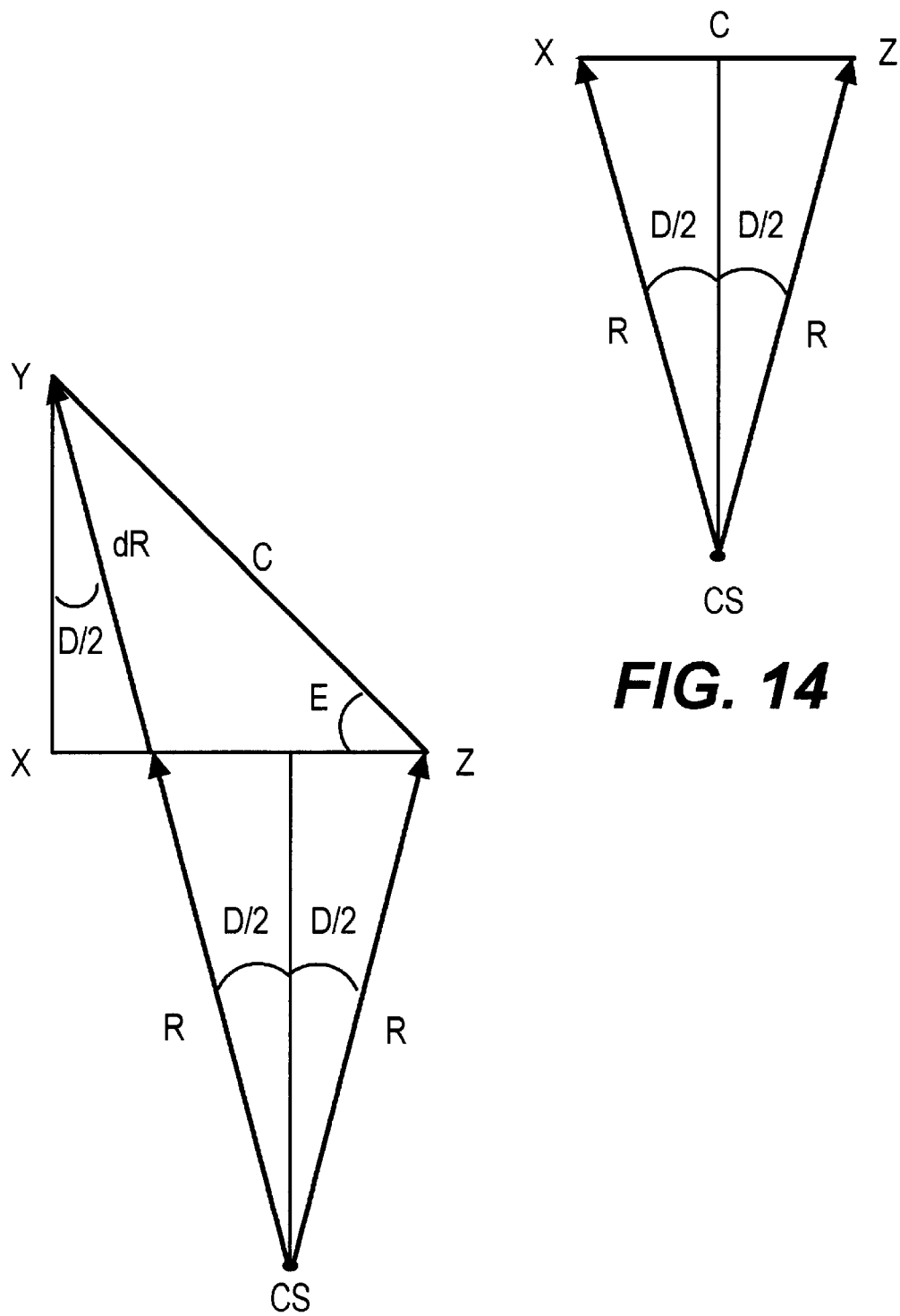
FIG. 14 depicts the geometric relationship of a radius to a curve generated by the radius wherein the length of the radius is held constant as the radius rotates some incremental amount counter-clockwise around a pivot point.
FIG. 15 depicts the geometric relationship of a radius to a curve generated by the radius wherein the radius increases in length as the radius rotates some incremental amount counter-clockwise around a pivot point.

As shown in FIG. 14, if a radius R were held constant as it rotated through some angle D about a point CS, a tangent C to an arc described by the radius R would define a straight line between points X and Z. Tangent C makes a right angle with respect to the radius at the center of the arc (angle D/2). If line X–Z also described a surface of a chamber against which the radius was pushing, at angle D/2, the angle of incidence between a direction of force from the radius and a direction of force from the surface would be 0. This relation describes a condition in traditional rotary engine technology, wherein the angle of incidence is 0 at the beginning and at the end of a combustion cycle. In order to achieve torque during all of the combustion cycle, the angle of incidence can be between 0 and 90 degrees at every point during the combustion cycle.

FIG. 15 depicts a tangent C between points Y and Z to an arc generated by rotation of a changing radius through some angle D about a fixed point CS. If tangent C is a surface against which the changing radius pushes, the angle of incidence between a direction of force from the radius and a direction of force from the surface would be angle E, which is some angle between 0 degrees and 90 degrees. The changing radius length at any given point in FIG. 15 can be equal to R+dR, wherein R is a starting radius length, and dR is a variable length equal to or greater than 0. If the values of R and dR are known over an angle D, angle of incidence E can be calculated. Conversely, if angle of incidence E is known for the midpoint D/2 of some angle of rotation D, the length dR can be determined.

According to various embodiments, a mathematical formula for a curve can be derived wherein the radius of the curve makes an angle of incidence greater than 0 degrees and less than 90 degrees with a surface at every point along the curve as the radius rotates about a fixed point of rotational reference. According to various embodiments, the angle of incidence can be between about 20 degrees and about 70 degrees at every point along the curve. The mathematical formula can be used to derive a curve that can be the contour of a movable contour and a portion of a stationary inner chamber wall.

With reference to FIG. 15, a pre-determined angle of incidence E can be used to calculate an amount dR by which a radius R has to increase to maintain angle of incidence E as the radius (R+dR) rotates about a crank shaft. For an angle of incidence E of 45°, the triangle XYZ in FIG. 15 has legs XY and XZ of equal length. The formula for determination of the change in radius dR in relation to the radius R necessary to create angle of incidence E of 45 degrees is:

$$dR*\cos(D/2)=dR*\sin(D/2)+2*R*\sin(D/2) \qquad (14)$$

$$dR*(\cos(D/2)-\sin(D/2))=2*R*\sin(D/2) \qquad (15)$$

$$dR/R=2*\sin(D/2)/(\cos(D/2)-\sin(D/2)) \qquad (16)$$

Formula 16 indicates that for a given angle of rotation D, for example, 1 degree, the radius R must change by a certain percentage, equal to length dR. The percentage R must change, dR/R, is constant in order to maintain a constant angle of incidence E of 45 degrees over some angle of rotation D. The percentage change can be an increase in length. For example, using formula 16, for a 45 degree angle of incidence E to be generated over 1 degree of rotation, the radius R can increase by about 1.76%. The percentage by which R changes (dR) can remain constant regardless of the initial value of R for each degree of rotation. A generic formula for angles other than 45 degrees can be generated by multiplying the right side of formula 16 by a scaling factor K. Scaling factor K is the difference in the length of leg XY of triangle XYZ as compared to the length of leg XZ when the angle of incidence E is changed from 45 degrees, wherein the lengths XY and XZ are equal. When angle of incidence E is not 45 degrees, the formula is:

$$dR/R=2*\sin(D/2)/(K*\cos(D/2)-\sin(D/2)). \qquad (17)$$

The scaling factor K is equal to 1/tan(E). When angle E is 45 degrees, 1/tan(45)=1, resulting in formula 16. Where angle E is not 45 degrees, K has some value not equal to 1. Formula 17 can be used to calculate by what percentage R must change over a degree of rotation D to generate a pre-determined angle of incidence E. A curve generated by Formula 16 or 17 using a constant angle of incidence E can rapidly spiral outward from a fixed point of rotation. For a less aggressive spiral with a smaller percentage change in radius, a changing angle of incidence E can be used. For example, the angle of incidence at the beginning of the curve can be 45 degrees or greater and less than 90 degrees, and can decrease gradually as R rotates about a fixed point. According to various embodiments, a changing angle of incidence, for example a continuously decreasing angle of incidence, can be maintained between 90 degrees and 0 degrees, or between 70 degrees and 20 degrees. Referring to Formula 14 with relation to FIG. 15, it can be seen that the term dR*sin(D/2) defines a very small value in relation to the other terms of the formula If term dR*sin(D/2) were subtracted from, instead of added to, term 2*R*sin(D/2), the value of the radius R would still be increasing, but more gradually, and the angle of incidence E would be gradually decreasing. Subtracting term dR*sin(D/2) from term 2*R*sin(D/2) and scaling by scaling factor K for a starting angle of incidence other than 45 degrees results in the following formula:

$$dR=2*R*\sin(D/2)/(K*\cos(D/2)+\sin(D/2)) \qquad (18)$$

Figure 16:
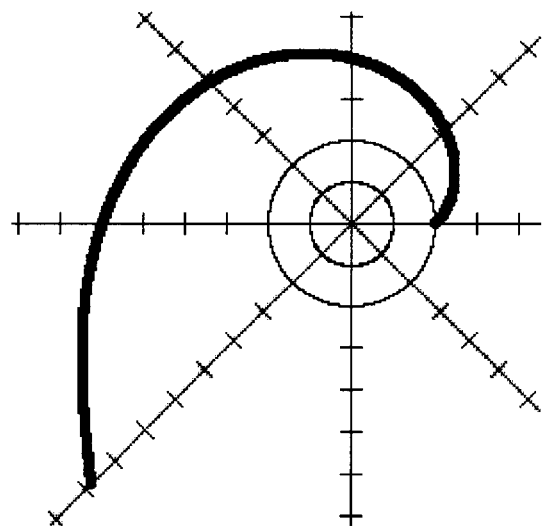
FIG. 16 is a graph of a curve generated wherein the radius constantly increases in length as the radius rotates counter-clockwise around a pivot point.

According to various embodiments, using the above formula 18 with a starting radius length R of 2 and a starting angle of incidence E of 45 degrees, K would be equal to 1, and a curve as shown in FIG. 16 would be generated.

FIG. 16 depicts an exemplary curve generated by formula 18, as well as a graph of two circles, one with a radius equal to 1 unit and one with a radius equal to 2 units. With reference to FIG. 16, a line drawn from the origin to a tangent at any point on the curve generated according to formula 18 will have an angle of incidence of 45 degrees at 0 degrees of rotation, and the angle of incidence will gradually decrease to about 20 degrees at 90 degrees of rotation. An inner chamber wall having the contour of the curve of FIG. 16 can be generated, which can result in an angle of incidence with a concave-shaped contour beginning at 45 degrees at 0 degrees of rotation and gradually decreasing to about 20 degrees at 90 degrees of rotation. Because a contour of an outer chamber wall can be a function of the contour of the inner chamber wall, the angle of incidence between a direction of a component of force generating torque from the concave-shaped contour and a force of the outer chamber wall will also vary from 45 degrees to about 20 degrees during the combustion cycle.

Figure 17:
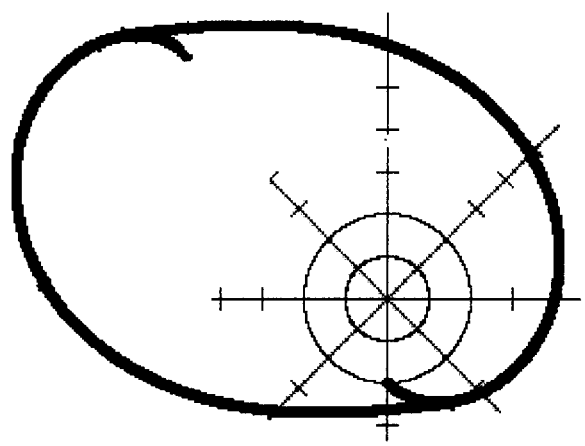
FIG. 17 depicts a shape of an embodiment of an inner chamber wall of an island and a position of a crank shaft on the island, wherein the shape is related to the curve of FIG. 16.

In order to form an inner chamber wall contour, a curve generated by formula 18, for example the curve shown in FIG. 16, can be repeated and rotated 180 degrees to form two intersecting curves of the same shape, as shown in FIG. 17. The shape generated, for example, in FIG. 17, can define an inner chamber wall and an island about which a concave-shaped contour can rotate within a chamber. The point of origin of the curve generated by formula 18 can be a location of a crank shaft within the island. According to various embodiments, and a shown in FIG. 17, the crank shaft can be off-center within the island. A concave-shaped contour that mates with the shape of the inner chamber wall can be generated, as shown in FIG. 18.

Figure 18:
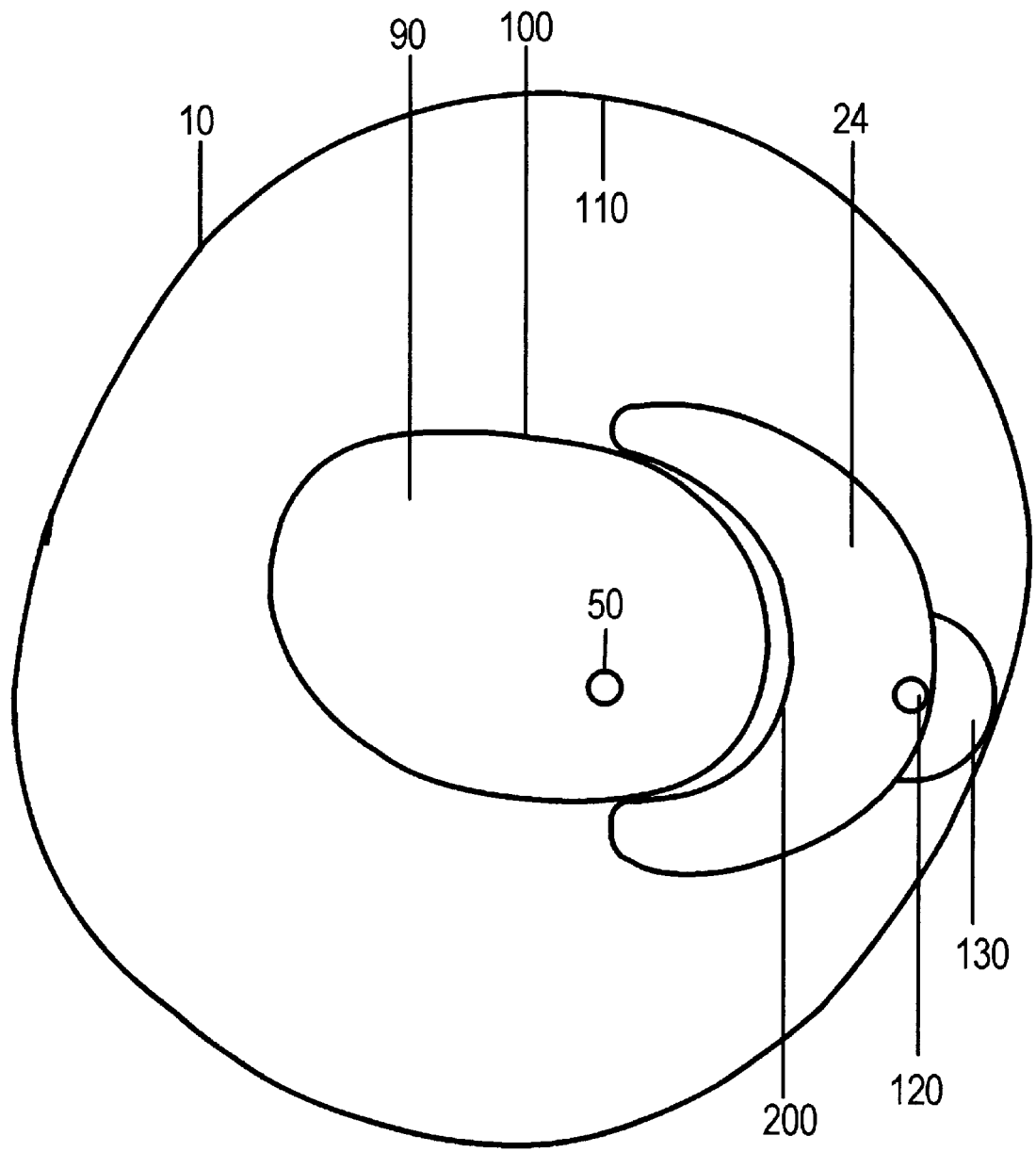
FIG. 18 is a schematic diagram of one embodiment of a rotary engine having the island of FIG. 17 with a concave-shaped contour, crank pivot, retainer, crank shaft and outer chamber wall.

Concave-shaped contour 24, as exemplified in FIG. 18, can have crank pivot 120 and retainer 130 off-set in relation to a center of inner curve 200. The position of crank pivot 120 and retainer 130 can correspond to a geometric center of rotation used to construct the inner curve 200, which center of rotation can correspond to the origin of the curve generated by formula 18, or the position of the crank shaft 50. FIG. 18 depicts the relation of inner chamber wall 100, island 90, outer chamber wall 110, concave-shaped contour 24 having crank pivot 120 and retainer 130, and crank shaft 50 in chamber 10, the contour and/or position of each of which is determined in relation to the curve generated by formula 18.

According to various embodiments, the shape of an outer chamber wall can be generated by moving a concave-shaped contour around an inner chamber wall. The outside chamber wall can be designed so as to hold the concave-shaped contour against the inner chamber wall while the retainer or outer curve of the concave-shaped contour moves along the outer chamber wall. FIG. 18 depicts a shape of an outer chamber wall 110 generated from an inner chamber wall 100 and a concave-shaped contour 24 as shown in FIG. 18. The outer chamber wall 110 can be derived from the same mathematical function as the inner chamber wall 100. According to various embodiments, the outer chamber wall 110 can have the same shape as at least a portion of the inner chamber wall 100, but larger in scale and rotated by some angle, for example 90°, about an origin during a portion of chamber 10 that corresponds to the combustion cycle.

Figure 19B:
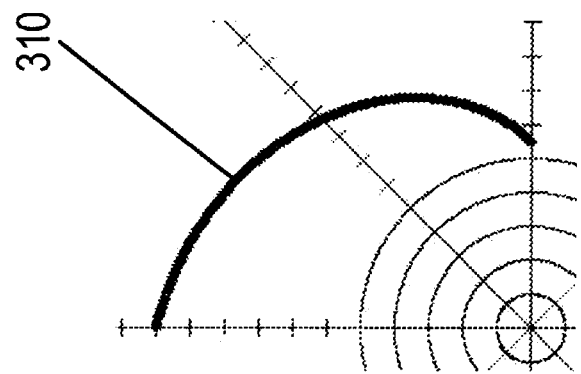
Figure 19A:
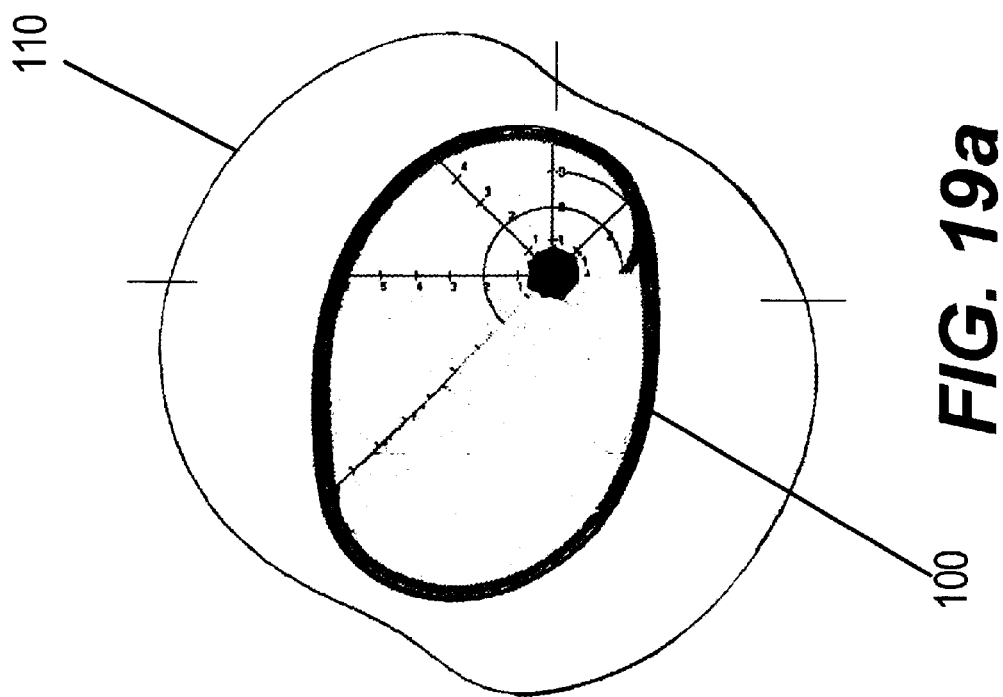
FIG. 19a is a diagram of the relation of an outer chamber wall to the island of FIG. 17.

FIG. 19a depicts an inner chamber wall 100 created from the curve of FIG. 16, and an outer chamber wall 110 generated by sliding a concave-shaped contour around inner chamber wall 100. The outer chamber wall 110 contour corresponds to a scaled version of a curve used to generate inner chamber wall 100. FIG. 19b depicts the scaled version 310 of the inner chamber wall curve depicted in FIG. 16. As can be seen by review of FIGS. 19a and 19b, the shape of the outer chamber wall 110 needed to hold a concave-shaped contour in constant contact with an inner chamber wall 100 can be a scaled version of the contour of the inner chamber wall 100, at least during a portion of the outer chamber wall 110 that corresponds to a combustion cycle.

A curve of an inner chamber wall can be varied from that determined by a formula set forth herein. Such variations in a shape of the curve of the inner chamber wall can be used to increase an efficiency of a total engine cycle, and form asymmetrical changes in the working volume during the various cycles. For example, an exhaust cycle and a compression cycle typically are characterized in traditional engines as cycles that contract the working volume by the same amount, respectively. In the engine described herein, the exhaust cycle and the compression cycle can be independent of one another because each cycle physically occurs in a different part of the engine chamber and can have a different size working volume. The exhaust cycle can be designed to contract the working volume more than the compression cycle in order to exhaust combustion byproducts more completely. More complete exhaustion can be achieved by modifying the shape of the inner chamber wall at a location corresponding to the exhaust cycle such that the shape of the inner chamber wall generates a greater change in the working volume during that cycle. Modifying the inner chamber wall shape can result in cycles that are no longer symmetrical with respect to working volume changes. An asymmetric engine cycle can be generated where the working volume changes by a different amount in one cycle than it did in one or more of the remaining cycles of intake, exhaust, compression, or combustion. Other modifications to the shape of the inner chamber wall to achieve other incremental improvements in efficiency will be apparent to practitioners in the art upon review and/or practice of this disclosure and the associated figures.

Figure 1A:
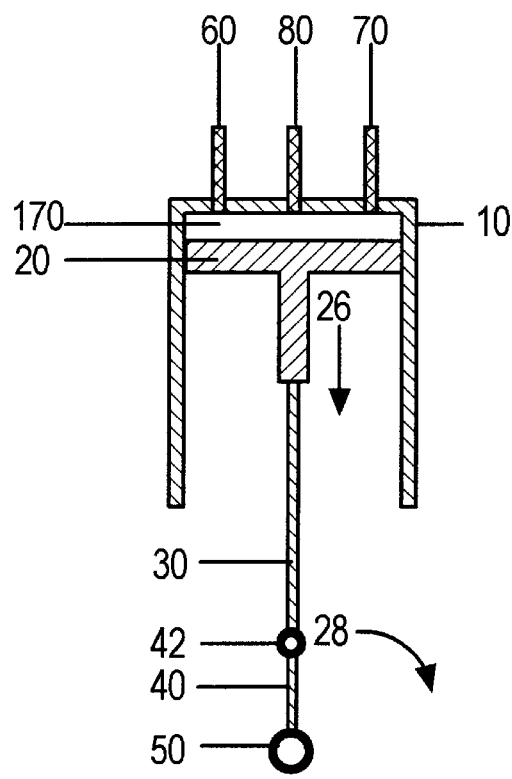
Figure 1B:
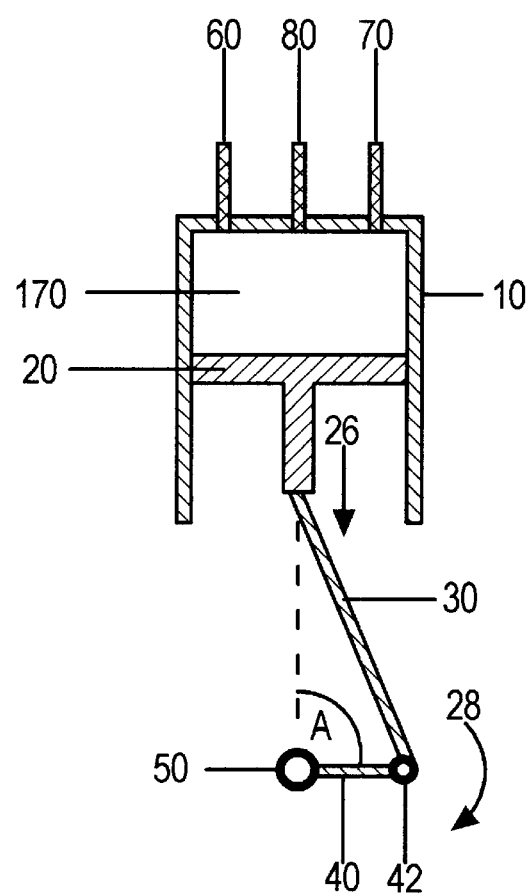
Figure 2:
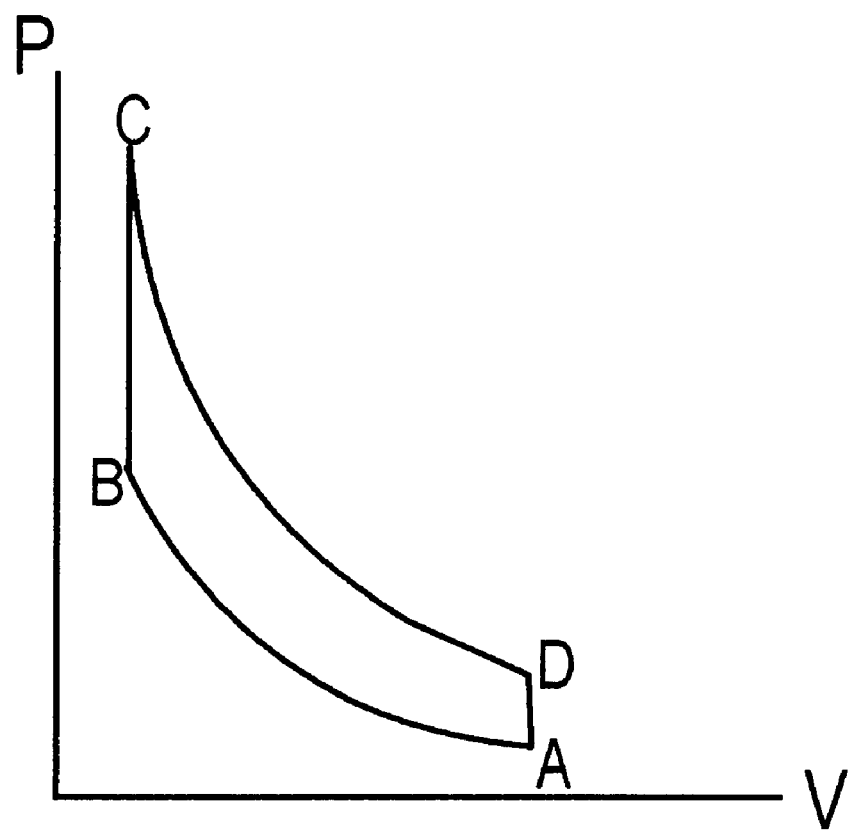
FIG. 2 is a graph of a pressure-volume curve of a piston engine.
Figure 3A:
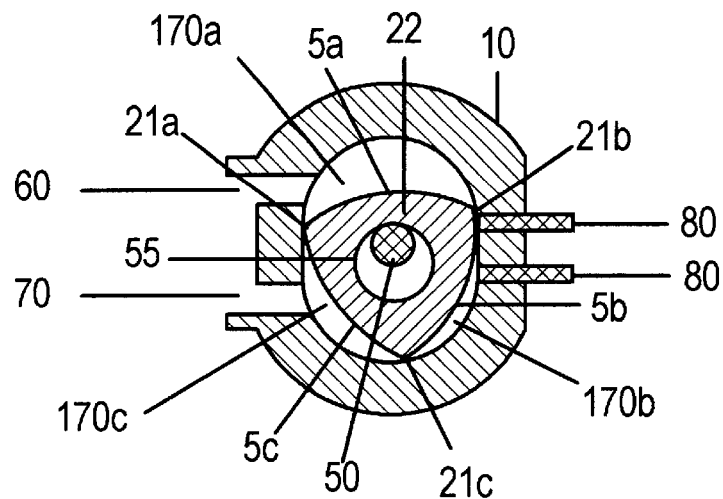
FIGS. 3a–c depict various positions of a rotor during an engine cycle of a Wankle rotary engine.
Figure 3B:
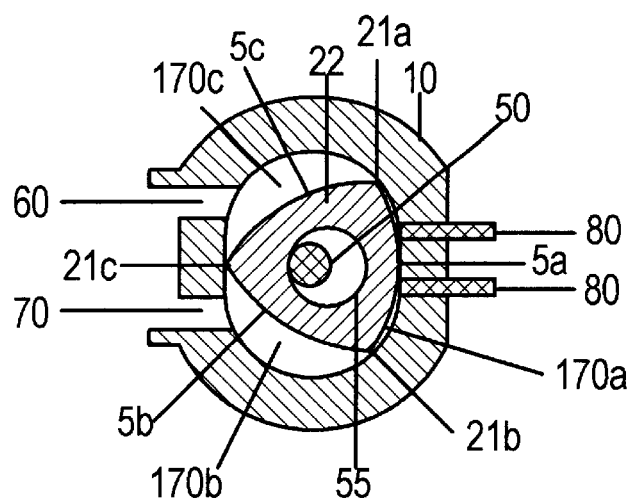
Figure 3C:
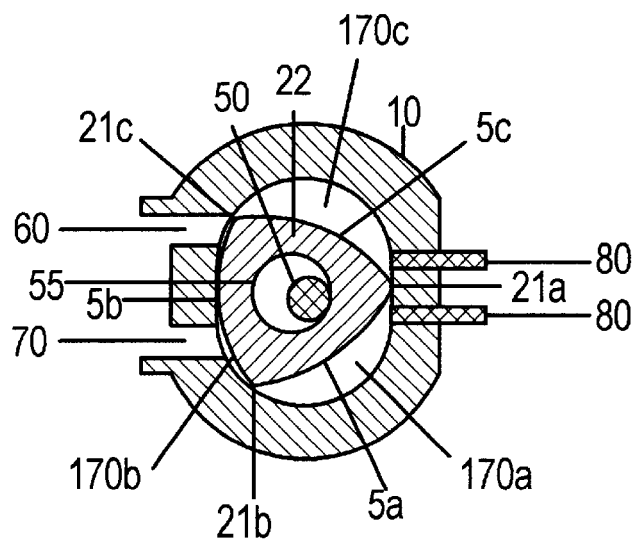
Figure 4:
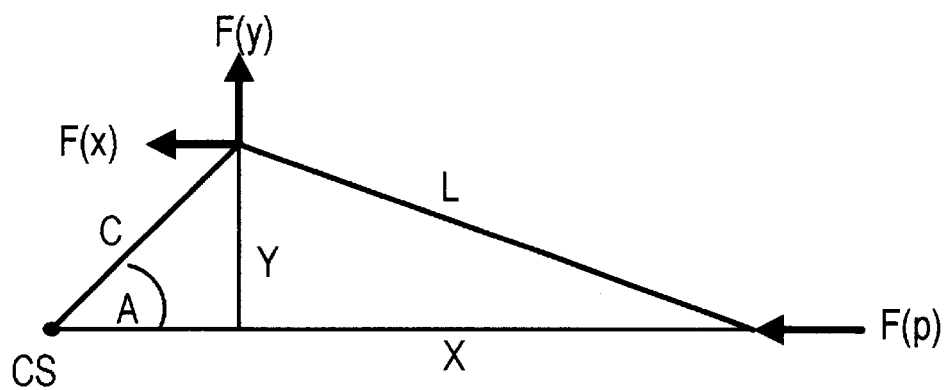
FIG. 4 depicts the geometric relationship between the force of a piston F(p) and torque generated about a crankshaft CS by movement of the piston.
Figure 5:
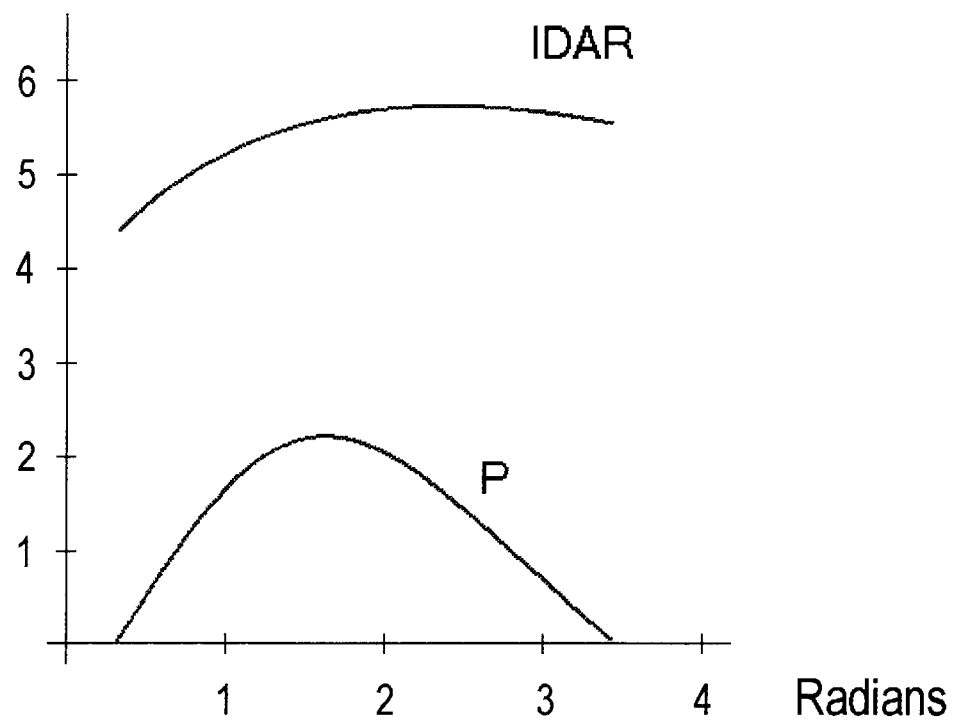
FIG. 5 depicts a graph of the translation of force to torque for a piston engine P and for an internal combustion rotary engine as described herein.
Figure 6:
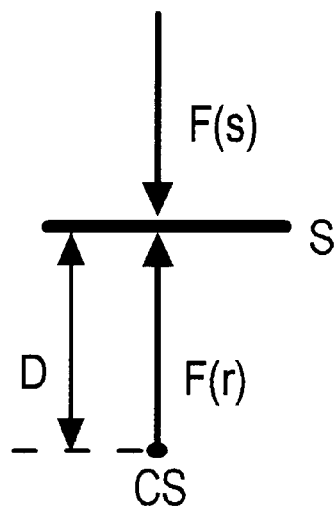
FIG. 6 depicts the geometric relationship between the force F(s) of a wall and the force F(r) of a rotor when the force of the rotor and component forces of the wall are in line.
Figure 7:
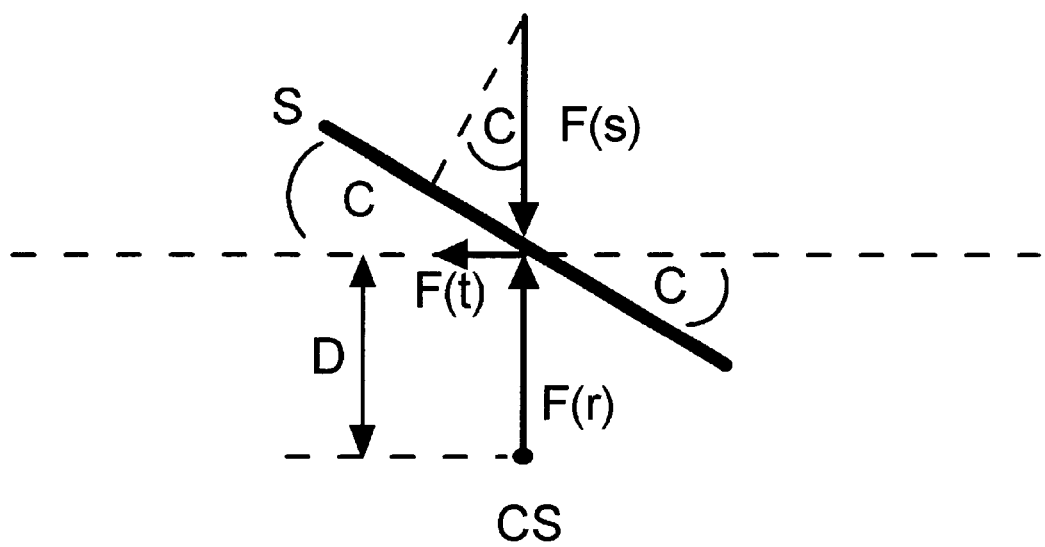
FIG. 7 depicts the geometric relationship between the force F(s) of a wall and the force F(r) of a rotor generating a component of torque F(t) when the force of the rotor and component forces of the wall are not in line.

A graph comparing a translation function of force into torque in a piston engine with the translation function of force into torque of an inverse displacement asymmetric rotary engine as described herein during the combustion cycle, wherein the two engines have the same displacement, is shown in FIG. 5. The torque generated by the piston engine (P) is at zero at the beginning of the combustion cycle, even though the force on the piston is largest at that point. The value of the torque generated goes up to some maximum value and back down to zero during the combustion cycle. The graph of the mechanical translation function for a comparable displacement inverse displacement asymmetric rotary engine (IDAR) does not start at zero. The IDAR graph has some value at the beginning of the combustion cycle, and the value increases during the combustion cycle, resulting in a continuous translation of force into torque. The continuous translation of force into torque seen in the IDAR curve can be due to an increase in a mechanical length of a crank arm throughout the combustion cycle of an inverse displacement asymmetric rotary engine. The continuous translation of force into torque seen in the IDAR curve can be due to optimization of an angle of incidence between a direction of the force of a concave-shaped contour and a direction of force of an outer chamber wall. Comparing the areas under the translation function curves P and IDAR demonstrates that the inverse displacement asymmetric rotary engine has a greater torque generation capability as compared to a traditional piston engine of the same displacement by a factor of about 4.

A continuous torque inverse displacement asymmetric rotary (IDAR) engine can be created with a constant or varying angle of incidence between the direction of force from a concave-shaped contour and a direction of force of an outer chamber wall. The resultant engine generates torque continuously throughout the combustion cycle. A location of a crank shaft on an island and a shape of an inner chamber wall in an IDAR engine can create an asymmetric path for a concave-shaped contour as it circumvents the inner chamber wall. The movement of the concave-shaped contour moves a working volume chamber, and therefore a working volume, about the crank shaft. A radius described from a crank shaft to the outer chamber wall or crank pivot changes throughout the four cycles of intake, compression, combustion, and exhaust, as the concave-shaped contour moves around the inner chamber wall, making the cycles asymmetric with respect to a distance from a fixed point of rotation, and creating asymmetrical working volumes as the working volume chamber changes in size.

Figure 20:
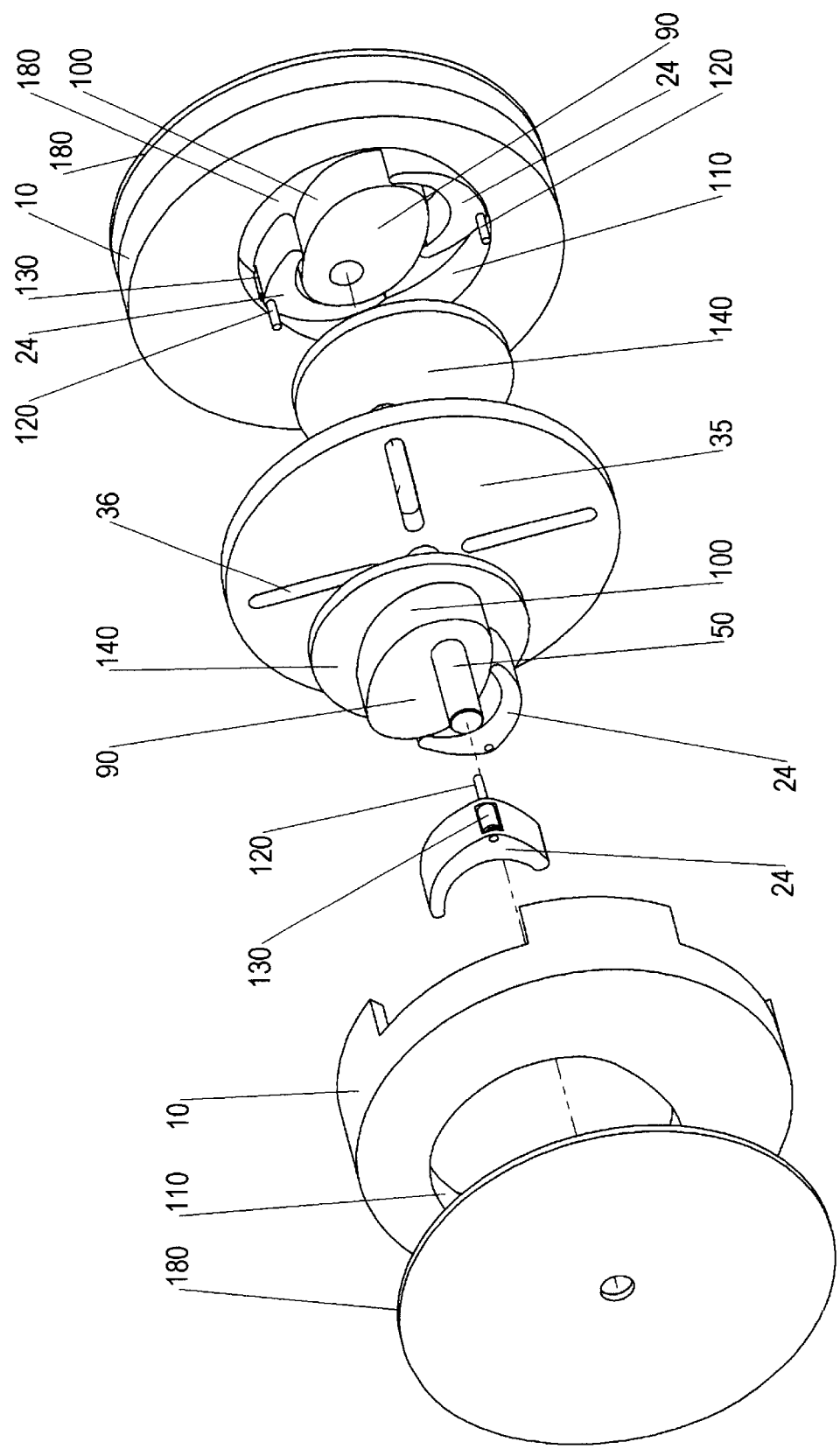
FIG. 20 is an exploded view of one embodiment of an engine having two chambers, a crank shaft and a crank disk, each chamber having two concave-shaped contours, a face plate, an inner chamber wall, a back chamber wall, and an outer chamber wall, and each concave-shaped contour having a retainer and a crank pivot.

According to various embodiments, an IDAR engine having two or more chambers rotated about a crank shaft and set with respect to each other to minimize vibration and wobble and achieve a balanced movement over the entire engine can be created. According to various embodiments and as shown in FIG. 20, two chambers 10 can be disposed adjacent each other and connected along a crank shaft 50. Each chamber 10 can include an inner chamber wall 100 about an island 90, an outer chamber wall 110, a back chamber wall 180, a concave-shaped contour 24 having a crank pivot 120 and a retainer 130, and a face plate 140. The crank pivot 120 of each concave-shaped contour 24 can interact with a slot 36 on a crank disk 35 attached to crank shaft 50. According to various embodiments, the slot can be a recess, chamber, channel or other depression capable of receiving crank pivot 120 in crank disk 35. According to various embodiments, the slot can extend through crank disk 35 such that crank pivot 120 can extend through crank disk 35 and beyond a top surface of crank disk 35. Each rotation of a concave-shaped contour 24 about inner chamber wall 100 rotates crank disk 35 and crank shaft 50 by interaction of crank pivot 120 with crank disk 35. According to various embodiments, each concave-shaped contour 24 is in a respective combustion cycle at a different time. Crank shaft 50 is positioned to allow turning without interference from the face plate 140, or island 90 within inner chamber wall 100. Each chamber 10 can be located within an engine block. The engine blocks can be joined together beyond a space of a crank disk 35 by bolts, screws, welding, adhesives, other fastening techniques known to one of ordinary skill in the art, or a combination thereof. Engine blocks can be joined to provide sufficient space for movement of crank disk 35, placement of crank disk 35 between chambers 10, placement of face plate 140 on each chamber 10, or a combination thereof. According to various embodiments, the chambers 10 can share a crank disk 35, or each chamber 10 can have a separate crank disk 35.

According to various embodiments and as shown in FIG. 20, two concave-shaped contours 24 can be located in a chamber 10, and multiple such chambers can be connected at their periphery beyond the movement of a crank disk 35. Crank shaft 50 can extend through each chamber 10. Each concave-shaped contour 24 can be connected to a crank disk 35 through respective crank pivot 120, such that one crank disk 35 can be turned by four concave-shaped contours 24 connected thereto. According to various embodiments, one concave-shaped contour can be located in each of four chambers. According to various embodiments, any number of concave-shaped contours equal to or greater than one, for example, one, two, four, or eight, can be connected to a single crank disk. According to various embodiments having two or more chambers 10, the chambers 10 can be offset from each other around a crank shaft 50 to create a balanced movement about the crank shaft, as shown in FIG. 20. According to various embodiments, for example, two chambers can be located around a crank shaft and rotated 180 degrees from each other, three chambers can be located around a crank shaft and rotated 120 degrees from each other, or four chambers can be located around a crank shaft and rotated 90 degrees from each other.

In contrast to traditional rotary or piston engines, an IDAR engine can have a working volume that expands during the combustion cycle in a different way than it can be compressed during the compression cycle. Changes in the working volume can be related to changes in radius as a concave-shaped contour moves around a chamber, varying a mechanical crank arm length. According to various embodiments, asymmetry of an engine can result from movement of the crank shaft off-center, resulting in asymmetric movement of a concave-shaped contour about an inner chamber wall during the four cycles. Asymmetry can be the result of changing a shape of one or more of an inner chamber wall, an outer chamber wall, or a concave-shaped contour to create asymmetry in the amount that the working volume changes in each cycle.

Practitioners skilled in the art may recognize embodiments other than those specifically described herein. All embodiments within the scope and purview of the claims, including equivalent methods, apparatus and means, are intended to be covered. The scope of the invention is now set forth in the appended claims.

It is claimed:

1. A rotary engine comprising one or more substantially concave-shaped movable contours, and a stationary convex surface elliptically shaped, wherein the substantially concave-shaped movable contours are confined to move about the stationary convex surface to define a working volume therebetween.

2. The engine of claim 1, wherein the stationary convex surface comprises a contour expressible in polar coordinates as $R+(2*R \sin(D/2)/(K*\cos(D/2)+\sin(D/2)))$, wherein K is a constant between 0.27 and 4.0, R is a length of a radius, and D is an angle of rotation of the radius about a point of rotation.

3. The engine of claim 2, wherein K is 1.0.

4. The engine of claim 1, wherein the working volume is capable of changing as the substantially concave-shaped movable contours move about the stationary convex surface.

5. The engine of claim 4, wherein the change in the working volume can correspond to an engine intake cycle, a compression cycle, a combustion cycle, or an exhaust cycle.

6. The engine of claim 4, wherein the working volume can be different between two or more of an engine intake cycle, a compression cycle, a combustion cycle, and an exhaust cycle.

7. The engine of claim 4, wherein the working volume is capable of increasing as the substantially concave-shaped moveable contours move from a position having a smaller radius of turn on the stationary convex surface to a position having a larger radius of turn on the stationary convex surface.

8. A rotary engine comprising:
   a chamber defined by an outer chamber wall, a back chamber wall, and an inner chamber wall surrounding an island, wherein the chamber has an intake port, an exhaust port, and an ignition port;
   a concave-shaped contour movable within the chamber and capable of slidably interacting with one or more of the outer chamber wall and the inner chamber wall;
   a crank pivot located on the concave-shaped contour;
   a crank disk capable of receiving and being moved by the crank pivot;
   a crank shaft disposed through the island and connected to the crank disk; and
   a face plate, wherein the faceplate, to concave-shaped contour, the back chamber wall, and the inner chamber wall define a working volume chamber including a working volume.

9. The engine of claim 8, wherein the concave-shaped contour slidably interacts with the outer chamber wall through a retainer.

10. The engine of claim 9, wherein the retainer is a roller bearing.

11. The engine of claim 8, wherein the working volume is capable of increasing as the concave-shaped contour moves from a position having a smaller radius of turn on the inner chamber wall to a position having a larger radius of turn on the inner chamber wall.

12. The engine of claim 8, wherein the shape of the inner chamber wall comprises a contour expressible in polar coordinates as $$R+(2*R \sin(D/2)/(K*\cos(D/2)+\sin(D/2))),$$

wherein K is a constant between 0.27 and 4.0, R is a length of a radius, and D is an angle of rotation of the radius about a point of rotation.

13. The engine of claim 12, wherein an inner curve of the concave-shaped contour is a function of the contour of the inner chamber wall.

14. The engine of claim 8, wherein the crank shaft is asymmetrically located within the island.

15. The engine of claim 8, wherein a distance from the crank shaft to the crank pivot is capable of changing throughout an engine cycle.

16. The engine of claim 8, wherein a distance from the crank shaft to the crank pivot is capable of increasing continuously during a combustion cycle.

17. The engine of claim 8, wherein a distance from the crank shaft to the crank pivot is capable of decreasing continuously during a compression cycle.

18. The engine of claim 8, wherein each cycle of the engine comprises subcycles of intake, compression, combustion and exhaust and each of the subcycles corresponds to an amount of rotation of the concave-shaped contour around the inner chamber wall as measured in degrees.

19. The engine of claim 18, wherein the amount of rotation for at least one subcycle is different than the amount of rotation of at least one other subcycle.

20. The engine of claim 18, wherein the working volume in at least one subcycle is different from the working volume of at least two other subcycles.

21. The engine of claim 8, wherein an angle of incidence between a direction of torque-generating force from the concave-shaped contour and a tangent of the outer chamber wall is between zero degrees and 90 degrees during a combustion cycle.

22. The engine of claim 21, wherein the angle of incidence is capable of changing as the concave-shaped contour moves about the inner chamber wall.

23. The engine of claim 21, wherein the angle of incidence is between about 15 degrees and about 75 degrees.

24. The engine of claim 21, wherein the angle of incidence is between about 30 degrees and about 60 degrees.

25. The engine of claim 21, wherein the angle of incidence is 45 degrees.

26. The engine of claim 8, further comprising a second concave-shaped contour movable within the chamber and capable of slidably interacting with the outer chamber wall and the inner chamber wall.

27. The engine of claim 26, wherein the second concave-shaped contour is positioned about 180 degrees about the crank shaft from the concave-shaped contour in the chamber.

28. The engine of claim 8, having a second chamber rotated 180 degrees about the crank shaft from the chamber.

29. The engine of claim 8, wherein the working volume chamber is capable of movement within the engine.

30. The engine of claim 29, wherein the movement of the working volume chamber is about the crank shaft.

31. The engine of claim 8, wherein the inner chamber wall is asymmetrically shaped.

32. A method of creating continuous torque in a combustion cycle of a rotary engine, comprising:

forming a working volume between a stationary convex inner chamber wall, a back chamber wall, a movable substantially concave-shaped contour, and a face plate; and moving the substantially concave-shaped contour around the stationary convex inner chamber wall by sliding the substantially concave concave-shaped contour along an outer chamber wall.

33. The method of claim 32, wherein an angle of incidence between a direction of torque-generating force from the substantially concave-shaped contour and a tangent of the outer chamber wall is between zero degrees and 90 degrees.

34. The method of claim 32, wherein the angle of incidence is between about 15 degrees and about 75 degrees.

35. The method of claim 32, wherein the angle of incidence is between about 30 degrees and about 60 degrees.

* * * * *

UNITED STATES PATENT AND TRADEMARK OFFICE
CERTIFICATE OF CORRECTION

PATENT NO.   : 6,758,188 B2
DATED        : July 6, 2004
INVENTOR(S)  : Joseph B. Woolridge It is certified that error appears in the above-identified patent and that said Letters Patent is hereby corrected as shown below:

<u>Column 14,</u>
Lines 18-22, should read:
-- According to various embodiments, crank disk 35 can be rotated in a circular or nearly circular path around crank shaft 50 by movement of concave-shaped contour 24 that interacts with crank disk 35 through crank pivot 120 that fits into slot 36 of crank disk 35. --.

Signed and Sealed this

Tenth Day of January, 2006

JON W. DUDAS
*Director of the United States Patent and Trademark Office*